US012776927B2

(12) United States Patent
Mackay et al.

(10) Patent No.: US 12,776,927 B2
(45) **Date of Patent: *Oct. 27, 2026**

(54) COMMUNICATION PROTOCOL USING BLOCKCHAIN TRANSACTIONS

(71) Applicant: nChain Licensing AG, Zug (CH)

(72) Inventors: Alexander Mackay, London (GB); Chloe Tartan, London (GB); Jad Wahab, London (GB); Antoaneta Serguieva, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 50 days.

This patent is subject to a terminal disclaimer.

(21) Appl. No.: 18/906,599

(22) Filed: Oct. 4, 2024

(65) Prior Publication Data

US 2025/0030566 A1 Jan. 23, 2025

Related U.S. Application Data

(63) Continuation of application No. 17/772,110, filed as application No. PCT/IB2020/059319 on Oct. 5, 2020, now Pat. No. 12,149,646.

(30) Foreign Application Priority Data

Oct. 31, 2019 (GB) ..................................... 1915841

(51) Int. Cl.

| | |
|---|---|
| ***H04L 9/00*** | (2022.01) |
| ***H04L 9/30*** | (2006.01) |
| ***H04L 9/32*** | (2006.01) |

(52) U.S. Cl.

CPC .................. *H04L 9/50* (2022.05); *H04L 9/30* (2013.01); *H04L 9/3268* (2013.01)

(58) Field of Classification Search

CPC . H04L 9/50; H04L 9/30; H04L 9/3268; H04L 9/3297; H04L 9/3236;

(Continued)

(56) References Cited

U.S. PATENT DOCUMENTS

| | | | | |
|---|---|---|---|---|
| 2019/0199535 | A1* | 6/2019 | Falk | G06F 16/1824 |
| 2019/0207757 | A1 | 7/2019 | Hennebert | |
| 2022/0303125 | A1* | 9/2022 | Enkhtaivan | H04L 9/3242 |

FOREIGN PATENT DOCUMENTS

| | | | |
|---|---|---|---|
| KR | 20190007336 | A | 1/2019 |
| KR | 101954304 | B1 | 5/2019 |
| WO | 2019171270 | A1 | 9/2019 |

OTHER PUBLICATIONS

Extended European Search Report issued in European Application No. 24212900.5, mailed on Feb. 24, 2025, 10 pages.

(Continued)

*Primary Examiner* — Brian Whipple

(74) *Attorney, Agent, or Firm* — Galvani Smith PLLC; Rowan P. Smith

(57) ABSTRACT

A computer-implemented method for granting permission to a requestor to join a first network. The first network comprises a set of bridging nodes and a set of devices controllable by one or more of the set of bridging nodes. Each bridging node is also a respective node of a blockchain network. The method is performed by a registration authority and comprises generating a first blockchain transaction. The first blockchain transaction comprises an input comprising a signature linked to a first public key of the registration authority. The first blockchain transaction also comprises a first output comprising a first certificate, the first certificate comprising an identifier assigned to the requestor. The method further comprises transmitting the first blockchain transaction to the blockchain network for inclusion in the blockchain.

20 Claims, 17 Drawing Sheets

(58) Field of Classification Search
CPC ... H04L 9/3239; H04L 9/3247; H04L 9/3263; H04L 9/321; H04L 63/0823; H04L 63/10; H04L 67/1046; H04L 67/1093; H04W 4/70
See application file for complete search history.

(56) References Cited

OTHER PUBLICATIONS

Vijayakumaran S., "A Deep Dive into Bitcoin and Bitcoin Scripts," Nov. 29, 2017, 59 Pages, XP055525209, Retrieved from the Internet: URL:https://www.isical.ac.inhrcbose/blockchain2017/lecture/Vijayakumaran_Slides.pdf.
Office Action for Japanese Application No. 2025020457, mailed on Apr. 21, 2026, 5 pages.

* cited by examiner

Figure 7a

| $Tx_1$ (partial) | | | |
|---|---|---|---|
| Inputs | | Outputs | |
| Value | | Value | |
| $x$ | $< Sig_{PK0} > \; < PK_0 >$ | 0 | OP_FALSE OP_RETURN 0x4d494f54 < *Command data* > |
| | | | |

701a

702a

Figure 7b

| $Tx_1$ (complete) | | | |
|---|---|---|---|
| Inputs | | Outputs | |
| Value | | Value | |
| $x$ | $< Sig_{PK0} > \; < PK_0 >$ | 0 | OP_FALSE OP_RETURN 0x4d494f54 < *Command data* > |
| > 0 | $< Sig_{PK1} > \; < PK_1 >$ | $x$ | OP_DUP OP_HASH160 $< H_{160}(PK_1) >$ OP_EQUALVERIFY OP_CHECKSIG |

701b

702b

Figure 8a

| $Tx_1$ (partial) | | | |
|---|---|---|---|
| Inputs | | Outputs | |
| Value | | Value | |
| $x$ | $< Sig_{PK0} >$ $< PK_0 >$ | 0 | OP_FALSE OP_RETURN<br>0x4d494f54 $<$ *Command data* $>$ |
| | | $x+\delta$ | OP_DUP OP_HASH160<br>$< H_{160}(PK_1) >$ OP_EQUALVERIFY<br>OP_CHECKSIG |

801a

802b

802a

Figure 8b

| $Tx_1$ (complete) | | | |
|---|---|---|---|
| Inputs | | Outputs | |
| Value | | Value | |
| $x$ | $< Sig_{PK0} >$ $< PK_0 >$ | 0 | OP_FALSE OP_RETURN<br>0x4d494f54 $<$ *Command data* $>$ |
| $> \delta$ | $< Sig_{PK1} >$ $< PK_1 >$ | $x$ | OP_DUP OP_HASH160<br>$< H_{160}(PK_1) >$ OP_EQUALVERIFY<br>OP_CHECKSIG |

801b

Figure 10a

| $Tx_1$ (partial) | | | |
|---|---|---|---|
| Inputs | | Outputs | |
| Value | | Value | |
| $x$ | $< Sig_{PKserv} >$ $< PK_{serv} >$ | 0 | OP_FALSE OP_RETURN 0x4d494f54 $<$ *Command data* $>$ |
| | | $x + \delta$ | OP_DUP OP_HASH160 $< H_{160}(PK_{slave}) >$ OP_EQUALVERIFY OP_CHECKSIG |

Figure 10b

| $Tx_1$ (complete) | | | |
|---|---|---|---|
| Inputs | | Outputs | |
| Value | | Value | |
| $x$ | $< Sig_{PKserv} >$ $< PK_{serv} >$ | 0 | OP_FALSE OP_RETURN 0x4d494f54 $<$ *Command data* $>$ |
| $> \delta$ | $< Sig_{PKslave} >$ $< PK_{slave} >$ | $x$ | OP_DUP OP_HASH160 $< H_{160}(PK_{slave}) >$ OP_EQUALVERIFY OP_CHECKSIG |

Figure 11a

| $Tx_1$ (request) | | | |
|---|---|---|---|
| Inputs | | Outputs | |
| Value | | Value | |
| $x_1$ | $< Sig_{PK0} >$ $< PK_0 >$ | 0 | OP_FALSE OP_RETURN 0x4d494f54 < *Command data* > |
| | | $y_1$ | OP_2 OP $< PK_1 > < PK_2 >$ OP_CHECKMULTISIG |

1101a 1102b 1102a

Figure 11b

| $Tx_2$ (approval) | | | |
|---|---|---|---|
| Inputs | | Outputs | |
| Value | | Value | |
| $x_2$ | $< Sig_{PK1} >$ $< PK_1 >$ $< Sig_{PK2} >$ $< PK_2 >$ | 0 | OP_FALSE OP_RETURN 0x4d494f54 < *Command data* > |
| | | $y_2$ | OP_DUP OP_HASH160 $< H_{160}(PK_3) >$ OP_EQUALVERIFY OP_CHECKSIG |

1101b 1102c

Figure 12a

| $Tx_1$ (partial) | | | |
|---|---|---|---|
| Inputs | | Outputs | |
| Value | | Value | |
| $x$ | $< Sig_{PKserv\_0} >$ $< PK_{serv\_0} >$ | 0 | OP_FALSE OP_RETURN 0x4d494f54 OP_PUSHDATA1 [*Payload length*] <*BIE1 Encrypted command data*> OP_PUSHDATA1 [*Payload length*] < *BIE1 Encrypted Encryption key* > |
| | | $x + \delta$ | OP_DUP OP_HASH160 $< H_{160}(PK_{slave\_0}) >$ OP_EQUALVERIFY OP_CHECKSIG |

Figure 12b

| $Tx_1$ (complete) | | | |
|---|---|---|---|
| Inputs | | Outputs | |
| Value | | Value | |
| $x$ | $< Sig_{PKserv\_0} >$ $< PK_{serv\_0} >$ | 0 | OP_FALSE OP_RETURN 0x4d494f54 OP_PUSHDATA1 [*Payload length*] <*BIE1 Encrypted command data*> OP_PUSHDATA1 [*Payload length*] < *BIE1 Encrypted Encryption key* > |
| $> \delta$ | $< Sig_{PKslave\_1} >$ $< PK_{slave\_1} >$ | $x + \delta$ | OP_DUP OP_HASH160 $< H_{160}(PK_{slave\_0}) >$ OP_EQUALVERIFY OP_CHECKSIG |

Figure 13

| Outputs | |
|---|---|
| Value | |
| 0 | OP_FALSE OP_RETURN OP_PUSHDATA1<br>0x4d494f54 – *IoT protocol identifier*<br>0x01 – *Payload type*<br>0x00000001 – *IoT software version number*<br>0x3dd5dfac...32 – *Device ID*<br>0x234a3789...22 – *Device Pubkey*<br>0x4d348912...87 – *Device certificate location data*<br>0x3ad21fac – *Command*<br>0x5665b456 – *Status*<br>0x5665b456 – *Previous status* |

Figure 15a

| $Tx_1$ (certificate) | | | |
|---|---|---|---|
| Inputs | | Outputs | |
| Value | | Value | |
| $x_1$ | < $Sig_{PKadmin}$ > < $PK_{admin}$ > | 0 | OP_FALSE OP_RETURN 0x4d494f54 < *Certificate data* > |
| | | $y_1$ | OP_DUP OP_HASH160 < $H_{160}(PK_{admin})$ > OP_EQUALVERIFY OP_CHECKSIG |

Figure 15b

| $Tx_1$ (partial) | | | |
|---|---|---|---|
| Inputs | | Outputs | |
| Value | | Value | |
| $x_2$ | < $Sig_{PKlaptop\_0}$ > < $PK_{laptop\_0}$ > | 0 | OP_FALSE OP_RETURN 0x4d494f54 < *Encrypted Command data* > |
| | | $y_2$ | OP_DUP OP_HASH160 < $H_{160}(PK_{controller\_0})$ > OP_EQUALVERIFY OP_CHECKSIG |

Figure 15c

| $Tx_1$ (controller) | | | |
|---|---|---|---|
| Inputs | | Outputs | |
| Value | | Value | |
| $x_2$ | < $Sig_{PKlaptop\_0}$ > < $PK_{laptop\_0}$ > | 0 | OP_FALSE OP_RETURN 0x4d494f54 < *Encrypted Command data* > |
| $x_3$ | < $Sig_{PKcontroller\_0}$ > < $PK_{controller\_0}$ > | $y_2$ | OP_DUP OP_HASH160 < $H_{160}(PK_{controller\_0})$ > OP_EQUALVERIFY OP_CHECKSIG |

Figure 16a

| $Tx_1$ (certificate) | | | |
|---|---|---|---|
| Inputs | | Outputs | |
| Value | | Value | |
| $x_1$ | $< Sig_{PKreg} >$ $< PK_{reg} >$ | 0 | OP_FALSE OP_RETURN<br>0x4d494f54 < *Certificate data* > |
| | | $y_1$ | OP_DUP OP_HASH160<br>$< H_{160}(PK_{reg}) >$ OP_EQUALVERIFY<br>OP_CHECKSIG |

1501a 1502b 1502a

Figure 16b

| Outputs | |
|---|---|
| Value | |
| 0 | OP_FALSE OP_RETURN OP_PUSHDATA1<br>< *payload length* ><br>0x4d494f54 – *IoT protocol identifier*<br>0x02 – *Payload type*<br>0x00000001 – *IoT software version number*<br>0x3dd5dfac...32 – *New device ID*<br>0x234a3789...22 – *New device Compressed Pubkey*<br>0x3ad21fac – *Device type*<br>0x00000004 – *Device IoT node type*<br>0x0000...06f – *IPv6 address and port number*<br>0x5664b456 – *UNIX time creation date*<br>0x5665b456 – *UNIX time certificate expiry date*<br>0x76d5335c......45 – *Additional information* |

COMMUNICATION PROTOCOL USING BLOCKCHAIN TRANSACTIONS

CROSS REFERENCE TO RELATED APPLICATIONS

This application is a continuation of U.S. application Ser. No. 17/772,110 filed Apr. 26, 2022, which is the U.S. National Stage of International Application No. PCT/IB2020/059319 filed on Oct. 5, 2020, which claims the benefit of United Kingdom Patent Application No. 1915841.9, filed on Oct. 31, 2019, the contents of which are incorporated herein by reference in their entireties.

TECHNICAL FIELD

The present disclosure relates to methods for granting permission to a requesting entity to join a network, e.g. in order for the requesting entity to access the network.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks by a process known as “mining”, which involves each of a plurality of mining nodes competing to perform “proof-of-work”, i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

SUMMARY

Internet of Things (IoT) technology enables networks of physical devices to monitor events and exchange data without human intervention. Motivating the development of IoT technology is the necessity for real-time data collection and automatic control mechanisms for replacing conventional monitoring and control methods across a wide-range of industries. IoT systems generate large volumes of data and rely on systems with network scalability, strong cybersecurity, reliable connectivity and minimal network latency.

Currently, centralised architecture models are widely used to authenticate, authorize and connect nodes in an IoT network. Such models are vulnerable to attack and act as a single point of failure. If a centralized system is compromised, permission to access the IoT network could be granted to malicious devices and/or removed from existing devices. If a malicious device is granted access to the IoT network, that device could, for instance, harvest sensitive data or disrupt the network.

Peer-to-Peer (P2P) architectures offer a more secure and efficient solution compared to centralised architectures, whereby neighbours interact directly with one-another without using any centralized node or agent between them. Blockchain technology is the foundation for secure P2P communication and is promising to revolutionize the development of IoT systems. However, if the next generation of blockchain based systems for IoT devices are to become a reality, blockchain-based control methods for IoT need to overcome challenges that are inherent in open systems. These include data privacy and device protection/control mechanisms that may not be inherent to the blockchain itself.

According to one aspect disclosed herein, there is provided a computer-implemented method for granting permission to a requestor to join a first network, wherein the first network comprises a set of bridging nodes and a set of devices controllable by one or more of the set of bridging nodes, and wherein each bridging node is also a respective node of a blockchain network; the method being performing by a registration authority and comprising: generating a first blockchain transaction, wherein the first blockchain transaction comprises an input comprising a signature linked to a first public key of the registration authority, and a first output comprising a first certificate, wherein the first certificate comprises an identifier assigned to the requestor; and transmitting the first blockchain transaction to the blockchain network for inclusion in the blockchain.

The first network (e.g. an IoT network) comprises one or more bridging nodes and one or more devices which can be controlled by one or more of the bridging nodes. The bridging nodes are also nodes of a blockchain network. That is, they are part of the IoT network and the blockchain network in the sense that they can connect both to the IoT network (e.g. to communicate with other network nodes and devices) and to the blockchain network (e.g. to transmit transactions to the blockchain and to identify and read from transactions recorded on the blockchain). These nodes act as a gateway or bridge between the first network and the blockchain network. They need not also have the roles of mining nodes, forwarding nodes or storage nodes of the blockchain network, though that is not excluded either. In some examples, one or more of the devices of the first network may also be a node of the blockchain network.

The registration authority (who may or may not a bridging node of the IoT network) is a node of the blockchain network. I.e. the registration authority is connected to the blockchain and is configured to transmit transactions to the blockchain network. The registration authority is responsible for granting certificates to requestors (requesting entities), those certificates then granting permission for a requestor to join the network. Here, once a requestor has joined the network, the requestor can perform tasks such as, for instance, communicating with other nodes and/or devices connected to the first network. The registration authority is a trusted party that can verify the credentials of new devices and issue digital certificates. The registration authority acts as a barrier to entry and allows or disallows new devices onto the IoT network.

The first blockchain transaction comprises, in an output of the transaction, a certificate issued to the requestor. The certificate comprises an identifier ("Device ID") unique to the requestor. The Device ID may be a pseudorandom string of bytes. The registration authority broadcasts the transaction (and therefore the certificate) to the blockchain network. The first blockchain transaction is linked, by way of the signature in the first input, to the registration authority. The signature is linked to the registration authority's public key. In other words, the signature is generated based on a private key corresponding to the registration authority's public key. Only the registration authority has knowledge of the private key and so only the registration authority can sign the transaction with its signature. In other words, the certificate cannot be forged. Therefore certificates can only be granted to genuine entities. When the requestor, once issued with a certificate, communicates with other nodes or devices of the first network, those nodes and devices can check whether the requestor has been issued with a certificate and therefore check whether the requestor is a genuine entity.

In some embodiments, the requestor is also a node of the blockchain network. In that case, the certificate may comprise a public key assigned to the requesting node. In other words, the public key is a certified public key. If the requesting node communicates with other nodes using its certified public key or a key derived therefrom, (e.g. sends transactions to the nodes or blockchain signed with one of said public keys), the other nodes can be confident that the node sending those transactions is a genuine node.

According to another aspect disclosed herein, there is provided a computer-implemented method for requesting permission to join a first network, wherein the first network comprises a set of bridging nodes and a set of devices controllable by one or more of the set of bridging nodes, and wherein each bridging node is also a respective node of a blockchain network; the method being performing by a requestor and comprising: transmitting, to a registration authority, a request to join the first network; and obtaining a first certificate, the certificate being issued by the registration authority and comprising an identifier assigned to the requestor.

BRIEF DESCRIPTION OF THE DRAWINGS

To assist understanding of embodiments of the present disclosure and to show how such embodiments may be put into effect, reference is made, by way of example only, to the accompanying drawings in which:

FIGS. 7*a* and 7*b* schematically illustrate partial and complete command transactions;

FIGS. 8*a* and 8*b* schematically illustrate alternative partial and complete transactions;

FIGS. 10*a* and 10*b* schematically illustrate partial and complete command transactions transmitted from a server node to a slave node;

FIGS. 11*a* and 11*b* schematically illustrate command request and approval transactions;

FIGS. 12*a* and 12*b* schematically illustrate encrypted partial and complete command transactions;

FIG. 13 illustrates an example command data format;

FIGS. 15*a* to 15*c* schematically illustrate example transactions for use in the peer-to-peer printing system; and FIGS. 16*a* and 16*b* schematically illustrate a certificate transaction and an example certificate format.

DETAILED DESCRIPTION OF EMBODIMENTS

Example System Overview

Figure 1:
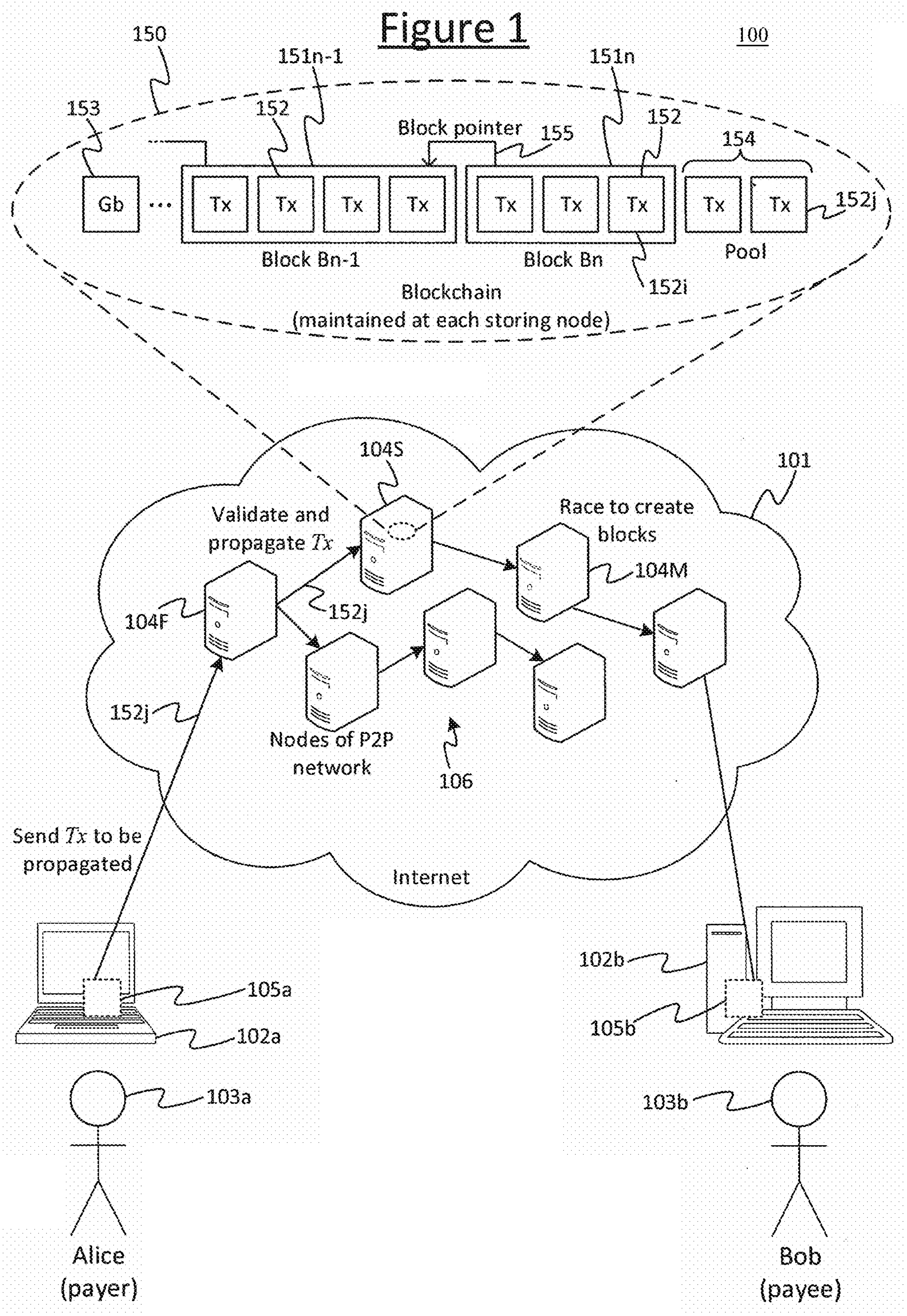
FIG. 1 is a schematic block diagram of a system for implementing a blockchain.

FIG. 1 shows an example system 100 for implementing a blockchain 150 generally. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme.

A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the pool 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the signature of the user 103*a* to whom the output of the preceding transaction 152*i* is locked. In turn, the output of the present transaction 152*j* can be cryptographically locked to a new user 103*b*. The present transaction 152*j* can thus transfer the amount defined in the input of the preceding transaction 152*i* to the new user 103*b* as defined in the output of the present transaction 152*j*. In some cases a transaction 152 may have multiple outputs to split the input amount between multiple users (one of whom could be the original user 103*a* in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152*j*, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152*j* matches the expected signature, which depends on the previous transaction 152*i* in an ordered sequence of transactions 152. In an output-based case, this may comprise checking that the cryptographic signature of the user included in the input of the new transaction 152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152*j* according to the node protocol. Another condition for a transaction to be valid is that the output of the preceding transition 152*i* which it attempts to spend or redeem has not already been spent/redeemed by another valid transaction. Again if not valid, the transaction 152*j* will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151*n* pointing back to the previously created block 151*n*-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151*n*, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n* in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152*j*, it handles it in accordance with the node protocol and its respective role. This comprises first checking whether the newly received transaction 152*j* meets a certain condition for being "valid", examples of which will be discussed in more detail shortly.

In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any storage node 104S that receives the transaction 152*j* will add the new validated transaction 152 to the pool 154 in the copy of the blockchain 150 maintained at that node 104S. Further, any forwarding node 104F that receives the transaction 152*j* will propagate the validated transaction 152 onward to one or more other nodes 104 in the P2P network 106. Since each forwarding node 104F applies the same protocol, then assuming the transaction 152*j* is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

UTXO-Based Model

Figure 2:
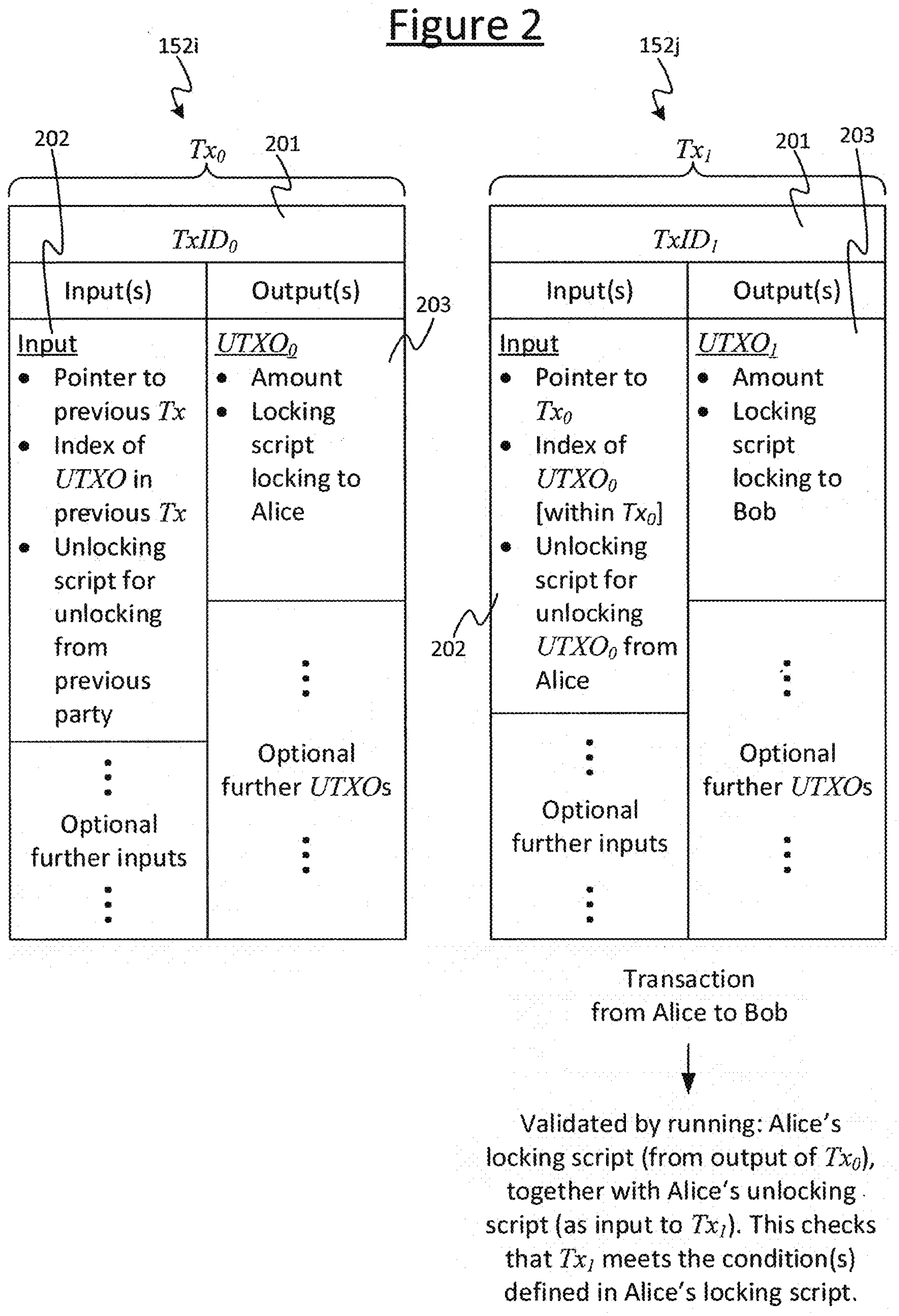
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Note that whilst each output in FIG. 2 is shown as a UTXO, a transaction may additionally or alternatively comprise one or more unspendable transaction outputs.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the unlocking script (in this example a stack-based language). Equivalently the scripts may be run one after another, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H(Pa)>OP_EQUALVERIFY OP_CHECKSIG. "OP_. . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Optional Side Channel

Figure 3:
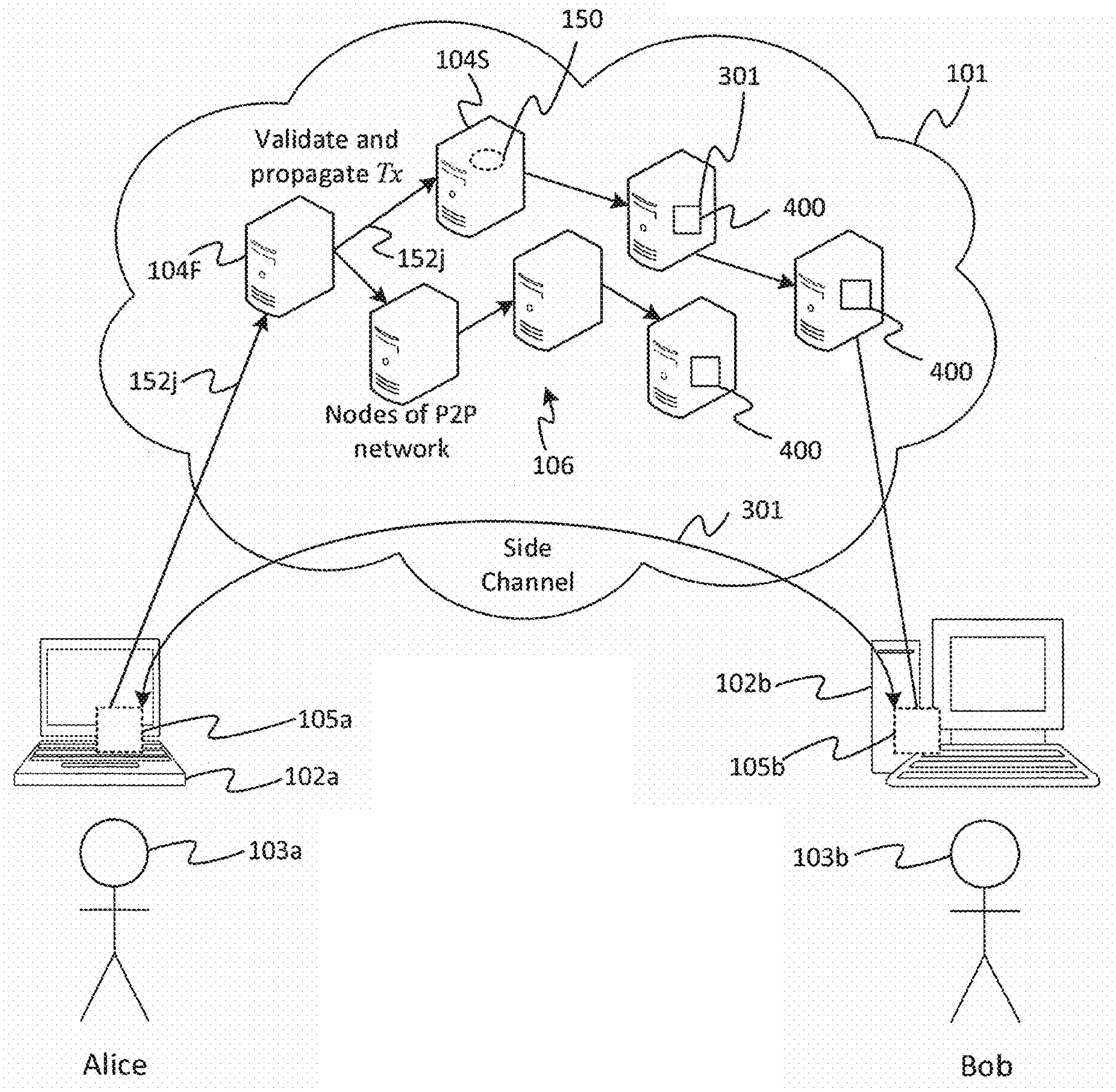
FIG. 3 is a schematic block diagram of another system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102*a*, 120*b*, respectively, comprises additional communication functionality. That is, it enables Alice 103*a* to establish a separate side channel 301 with Bob 103*b* (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Alternatively or additionally, the side channel 301 may be used to exchange any other transaction related data, such as keys, negotiated amounts or terms, data content, etc.

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 1021, 102*b*. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Node Software

Figure 4:
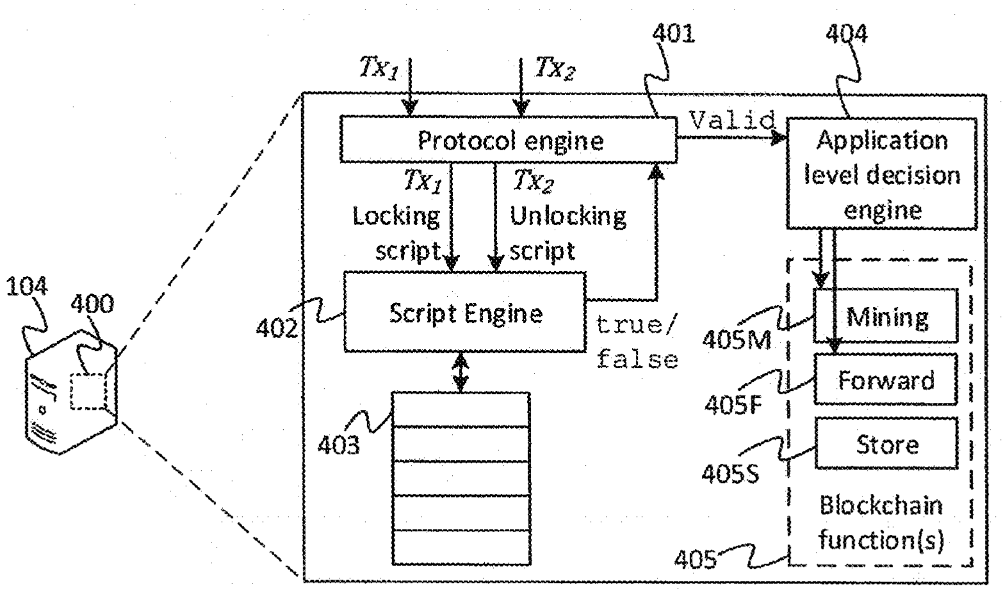
FIG. 4 is a schematic block diagram of a piece of node software for processing transactions in accordance with a node protocol of an output-based model.

FIG. 4 illustrates an example of the node software 400 that is run on each node 104 of the P2P network 106, in the example of a UTXO- or output-based model. The node software 400 comprises a protocol engine 401, a script engine 402, a stack 403, an application-level decision engine 404, and a set of one or more blockchain-related functional modules 405. At any given node 104, these may include any one, two or all three of: a mining module 405M, a forwarding module 405F and a storing module 405S (depending on the role or roles of the node). The protocol engine 401 is configured to recognize the different fields of a transaction 152 and process them in accordance with the node protocol. When a transaction 152*m* ($Tx_m$) is received having an input pointing to an output (e.g. UTXO) of another, preceding transaction 152*m*-1 ($Tx_{m-1}$), then the protocol engine 401 identifies the unlocking script in $Tx_m$ and passes it to the script engine 402. The protocol engine 401 also identifies and retrieves $Tx_{m-1}$ based on the pointer in the input of $Tx_m$. It may retrieve $Tx_{m-1}$ from the respective node's own pool 154 of pending transactions if $Tx_{m-1}$ is not already on the blockchain 150, or from a copy of a block 151 in the blockchain 150 stored at the respective node or another node 104 if $Tx_{m-1}$ is already on the blockchain 150. Either way, the script engine 401 identifies the locking script in the pointed-to output of $Tx_{m-1}$ and passes this to the script engine 402.

The script engine 402 thus has the locking script of $Tx_{m-1}$ and the unlocking script from the corresponding input of $Tx_m$. For example $Tx_1$ and $Tx_2$ are illustrated in FIG. 4, but the same could apply for any pair of transactions, such as $Tx_0$ and $Tx_1$, etc. The script engine 402 runs the two scripts together as discussed previously, which will include placing data onto and retrieving data from the stack 403 in accordance with the stack-based scripting language being used (e.g. Script).

By running the scripts together, the script engine 402 determines whether the unlocking script meets the one or more criteria defined in the locking script—i.e. does it "unlock" the output in which the locking script is included? The script engine 402 returns a result of this determination to the protocol engine 401. If the script engine 402 determines that the unlocking script does meet the one or more criteria specified in the corresponding locking script, then it returns the result "true". Otherwise it returns the result "false".

In an output-based model, the result "true" from the script engine 402 is one of the conditions for validity of the transaction. Typically there are also one or more further, protocol-level conditions evaluated by the protocol engine 401 that must be met as well; such as that the total amount of digital asset specified in the output(s) of $Tx_m$ does not exceed the total amount pointed to by the input(s), and that the pointed-to output of $Tx_{m-1}$ has not already been spent by another valid transaction. The protocol engine 401 evaluates the result from the script engine 402 together with the one or more protocol-level conditions, and only if they are all true does it validate the transaction $Tx_m$. The protocol engine 401 outputs an indication of whether the transaction is valid to the application-level decision engine 404. Only on condition that $Tx_m$ is indeed validated, the decision engine 404 may select to control one or both of the mining module 405M and the forwarding module 405F to perform their respective blockchain-related function in respect of $Tx_m$. This may comprise the mining module 405M adding $Tx_m$ to the node's respective pool 154 for mining into a block 151, and/or the forwarding module 405F forwarding $Tx_m$ to another node 104 in the P2P network 106. Note however that in embodiments, while the decision engine 404 will not select to forward or mine an invalid transaction, this does not necessarily mean that, conversely, it is obliged to trigger the mining or the forwarding of a valid transaction simply because it is valid. Optionally, in embodiments the decision engine 404 may apply one or more additional conditions before triggering either or both functions. E.g. if the node is a mining node 104M, the decision engine may only select to mine the transaction on condition that the transaction is both valid and leaves enough of a mining fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model (not illustrated in FIG. 4), a result of "true" could be indicated by a combination of an implicit, protocol-level) validation of a signature by the node 104 and an additional affirmative output of a smart contract (the overall result being deemed to signal true if both individual outcomes are true).

Internet of Things

IoT is the extension of the internet into everyday physical devices and objects. Embedded with computational processing power and internet connectivity, devices can communicate and interact with each other and can be remotely monitored and controlled. Over time the definition of IoT has evolved due to machine learning, real-time analytics and the convergence of multiple technologies, although it is generally accepted that systems of devices that can support wireless sensor networks and/or control systems are likely to enable IoT.

IoT systems face several challenges. For instance, the scalability and cost of such systems may prohibit IoT systems reaching their full potential. When connected and controlled in a centralized way IoT devices require back-end infrastructures for transmitting data and receiving control commands. These back-end infrastructures are hosted either on third-party cloud services or on-premise server farms. The scalability of the IoT solutions is then determined by the scalability of the back-end servers and data centres which can reach prohibitively high operating costs of the IoT service providers. As a result, many proposed IoT solutions are not cost effective and are unsuitable for use in every-day scenarios. Performance measurements such as network latency will also become a significant factor determining the rate of IoT adoption.

Another challenge facing IoT systems is the trade-off between automation and control. IoT solutions are designed to enable remote access and control to everyday electronic devices. Most IoT solutions strike a balance between full user control and automated communication between devices and other IoT solution components. In the cases where either the device or the IoT system malfunctions, safety measures such as an override mechanism need to be in place.

Another challenge is the threat from cyber-attacks. By enabling the automated control of devices over the internet, users expose themselves to potential security risks which come in two forms, one is privacy risk incurred by transmitting IoT device metadata over the internet. For example, if eavesdroppers gain access to data from devices such as home appliances, patterns in device use could be used by criminals, e.g. burglars to predict when a person is at home. The second risk is the possibility of attackers or other third parties gaining control of the IoT devices. For performance critical control software, such as that used to operate heavy machinery or dangerous goods, an attack could have catastrophic consequences.

IoT systems can either be designed to be centralised or decentralised and/or hybrid. Centralised solutions suffer from bottlenecks but can enable faster and more reliable control by privileged components in the IoT system. Decentralised reporting of state updates enables IoT solutions to be more scalable. Edge computing can help reduce network latency for critical applications, lower the dependence of IoT systems on the cloud and provide better management of the large amounts of IoT data. The rise of decentralised processing highlights the opportunities in systems architecture to better harness the benefits of centralised and distributed architectures. A hybrid system that combines a centralised and distributed system within hierarchical control structures may enhance user safety and usability purposes.

Blockchain technology has the potential to play a leading role in the future of IoT for the following reasons: blockchain enables the integration of payment and control into one network; existing infrastructure can be used to piggy-back messages regarding device-state changes; and decentralised control of data on the network enables faster user-device interaction. Combined with blockchain technology, traditional IoT devices that perform roles in the physical world will be able to message and exchange value simultaneously. Public blockchains serve as a global payment network as well as a general-purpose commodity ledger with strong cryptographic security built into its protocol that automatically addresses several of the risks associated with IoT.

Figure 5:
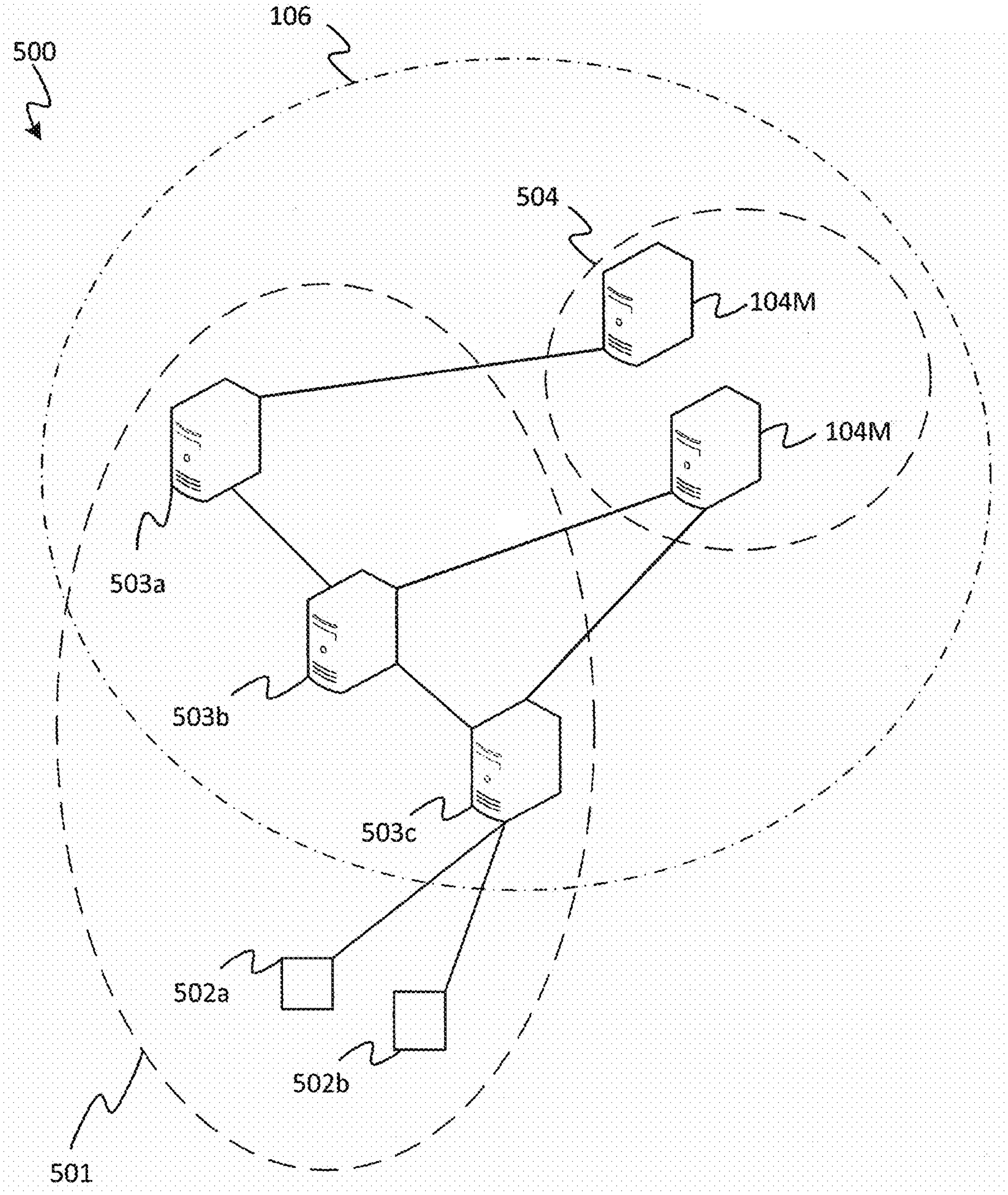
FIG. 5 schematically illustrates the overlap between an IoT network and a blockchain network.

FIG. 5 illustrates an example system 500 for implementing embodiments of the present disclosure. The example system 500 comprises a first network 501 of one or more end devices (i.e. computing devices) 502 and one or more bridging nodes 503 (i.e. computing devices which run a blockchain client application and therefore act as a bridge between the blockchain network 106 and the first network 501). For clarity, the first network 501 will be referred to as an IoT network, i.e. a network of computing devices inter-connected by the internet. Typically the end devices 502 and bridging nodes 503 are embedded in everyday devices. An end device 502 may take one of a variety of forms, e.g. user devices (e.g. smart TVs, smart speakers, toys, wearables, etc.), smart appliances (e.g. fridges, washing machines, ovens, etc.), meters or sensors (e.g. smart thermostats, smart lighting, security sensors, etc.). Similarly, a bridging node 503 may also take a variety of forms, which may include, but is not limited to, the same forms as which an end device may take. A node 503 may also take the form of dedicated server equipment, a base station, an access point, a router, and so on. In some examples, each device may have a fixed network (e.g. IP) address. For instance, one, some or all of the end devices may be a stationary device (e.g. a smart light, or smart central heating controller, etc.), as opposed to a mobile device.

The IoT network is a packet-switched network 101, typically a wide-area internetwork such as the Internet. The nodes 503 and devices 502 of the packet-switched network 101 are arranged to form a peer-to-peer (P2P) overlay network 501 within the packet-switched network 101. Each node 503 comprises respective computer equipment, each comprising respective processing apparatus comprising one or more processors, e.g. one or more central processing units (CPUs), accelerator processors, application specific processors and/or field programmable gate arrays (FPGAs). Each node 503 also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

Each node 503 of the IoT network is also a blockchain node 104. These nodes 503 are arranged as bridging nodes (gateway nodes) which act as a bridge (gateway) between the first network 501 and the blockchain network 106. A blockchain node 104 may be a "listening node". A listening node runs a client application that keeps a full copy of the blockchain, validates and propagate new transactions and blocks but does not actively mine or generate new blocks. Alternatively, a node may be a "simplified payment verification node" (SPV node). An SPV node runs a lightweight client that can generate and broadcast bitcoin transactions and monitor addresses indirectly but does not keep a full copy of the blockchain.

Each node 503 of the IoT network is configured to control an end device 502 either directly or indirectly. A node 503 that is directly connected to an end device 502 can directly control that device. A node 503 that is not directly connected to an end device 502 can only indirectly control that device, e.g. by forwarding a control message to the end node via one or more intermediary nodes. Each node 503 is connected to one or more mining nodes 104M.

FIG. 5 also illustrates a network 504 of mining nodes 104M which is a subset of the blockchain network 106. Mining nodes have been discussed above with reference to FIGS. 1 to 3. The mining nodes 104M are configured to mine valid transactions (e.g. transactions transmitted from the IoT nodes) to the blockchain 150.

As shown in FIG. 5, the nodes 503 form part of both the P2P network 501 and the blockchain P2P network 106, whereas the mining nodes 104M form part of only the blockchain P2P network 106. Whilst the end devices 502 are shown in FIG. 5 as forming part of only the P2P IoT network 501, it is not excluded that the end devices 502 could also be blockchain nodes 104.

Figure 6:
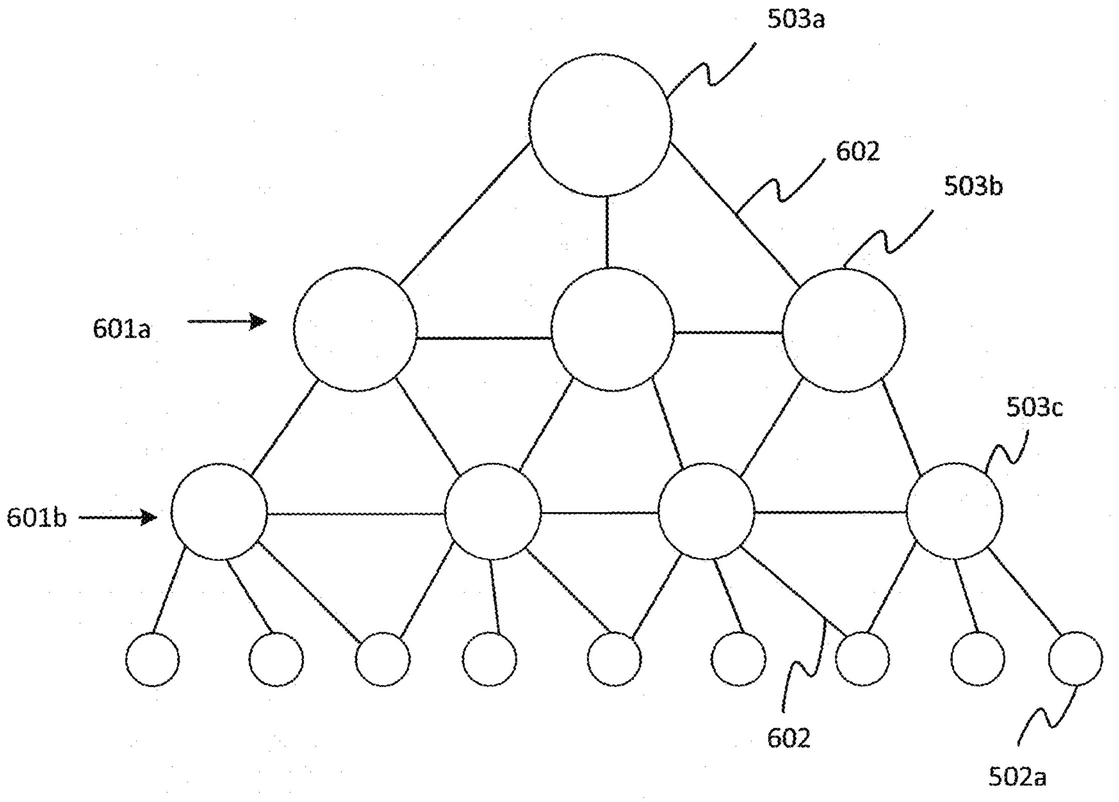
FIG. 6 schematically illustrates a hierarchical network topology.

FIG. 6 illustrates an example IoT network 501 topology. The IoT network 501 may control a master node 503*a*, one or more sets 601 of one or more intermediary nodes 503*b*, 503*c*, and a set of end devices 502. The master node 502*a* is configured to control one or more intermediary nodes 503*b*, 503*c*. If the IoT network 501 comprises multiple sets (e.g. layers) 601*a*, 601*b* of intermediary nodes, the master node 503*a* is configured to directly control the first set (layer) 601*a* of intermediary nodes ("server nodes" 503*b*) and to indirectly control one or more further sets (layers) 601*b* of intermediary nodes (e.g. a layer of "slave nodes" 503*c*). The master node 503*a* is a controlling node with the ability to override and control server and slave nodes. Each server node 503*b* is a node with the ability to control slave nodes 503*c*. Each slave node 503*c* is a node under the control of the server nodes 503*b* and the master node 503*a*. As an example, to instruct end device 502*a*, the master node 503*a* would issue a command to slave node 503*c* via servant node 503*b*.

Whilst the example IoT network of FIG. 6 shows only two layers of intermediary nodes (server nodes and slave nodes), other examples may comprise one or more further sets of intermediary nodes, e.g. between the master node 503*a* and server nodes 503*b*, and/or between the server nodes 503*b* and slave nodes 503*c*. As shown, each node is connected to one or more other nodes via a respective connection 602, and each end device 502 is connected to one or more slave nodes via a respective connection 602. One or more nodes (e.g. the master node) are referred to below as controlling nodes. Each controlling node is a node 503 that can instruct other nodes to perform an action through issuing commands.

The IoT network nodes 503 may correspond to hierarchies in scope of functionality, in superiority of instructions/prerogatives, and/or in span of access. In some implementations, a hierarchical set of SPV nodes implement an "IoT controller" with three levels of hierarchy, corresponding to the master 503*a*, server 503*b* and slave nodes 503*c* of FIGS. 5 and 6. The master node 503*a* instructs one or more server nodes 503*b*, and each server node instructs one or more slave nodes 503*c*. Each slave node 503*c* receives instructions from one or more server nodes 503*b*. Every slave node 503*c* communicates with one or more IoT end-devices 502, and these are the direct channels of communication between the IoT-controller 503 and the IoT end-devices 502. The states of execution of the IoT controller 503 are recorded in blockchain transactions Tx. Each IoT node—master, server, or slave—has the capacity to create and broadcast corresponding transactions Tx to the blockchain network 106. Each slave node monitors for trigger and/or confirmation signals from end-devices 502, and every IoT node 503 has the capacity to interact with any other IoT node with the purpose of executing the overall logic of the IoT controller.

The master node, server node(s) and slave node(s) can each independently connect to nodes 104 on the blockchain network 106, operate a blockchain wallet (e.g. to watch blockchain addresses) and possibly run a full node (although this is not required). The master node 503*a* is configured to monitor the activity of other IoT nodes both directly and indirectly under their control, issue commands to these nodes in the form of blockchain transactions Tx and respond to alerts. The server node 503*b* is configured to watch multiple addresses, including addresses not directly controlled by the server node 503*b*. Server nodes 503*b* can be commanded to perform actions by a master node 503*a*. The slave node 503*c* is configured to monitor the activities of end devices 502 directly under their control. Slave nodes 503*c* are under the direct command of server nodes 503*b* and can also be commanded to perform actions by the master node 503*a*. The slave nodes 503*c* act as gateway nodes for the end devices 502 (i.e. a gateway between the end device and the blockchain network 106). The end device 502 is configured to connect to nearby slave devices. They report on end device state using off-chain messaging protocol.

Note that whilst a distinction is made between an IoT node 503 and an end device 502 in that end devices 502 are controlled by IoT nodes 503 but do not themselves control IoT nodes 503, an end device 502 may also be a node 104 of the blockchain network 106. That is, in some examples an end device 502 may operate a blockchain protocol client or wallet application.

The IoT network 501 strikes a balance between centralisation and decentralisation by combining a command and control hierarchy with use of a blockchain network infrastructure. Users of the network 501 may create their own multilevel control hierarchy which includes client-server as well as peer-to-peer relationships between devices. The network architecture comprises three layers: an IoT network 501, a blockchain P2P network 104 (i.e. full and lightweight blockchain clients, e.g. the master, servant and slave nodes are lightweight clients operating SPV wallets), and a blockchain mining network 504 (a subset of the blockchain P2P network that validates, propagates and stores the transactions propagated by the IoT nodes). The blockchain network 106 acts as backend infrastructure and there is an overlap between the IoT network 501 and the blockchain P2P network 106.

Permissioning Protocol

Embodiments of the present disclosure provide for a protocol for granting permission to join a network 501 to a node 503 or device 502 requesting access to the network 501. In the context of IoT, new nodes 503 are permitted onto the IoT network 501 using on-chain forgery resistant digital certificates provided by a registration authority (e.g. a trusted entity within the network). The protocol solves problems associated with cyber-attacks by ensuring that only genuine nodes can access the network and/or control other nodes or devices within the network.

Permission to join the IoT network 501 is granted by a registration authority (the registration authority may also be referred to as a "permission granting authority" or a "certificate authority"). The registration authority is responsible for issuing digital certificates to requesting entities (e.g. a requesting node or a requesting device). An entity with a valid certificate has access to the IoT network 501. The registration authority comprises respective computer equipment, each comprising respective processing apparatus comprising one or more processors, e.g. one or more central processing units (CPUs), accelerator processors, application specific processors and/or field programmable gate arrays (FPGAs). The computing equipment of the registration authority also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

In order to grant permission for a requesting entity to join the network 501, the registration authority generates a blockchain transaction Tx, referred to below as a "certificate transaction". An example certificate transaction is illustrated in FIG. 16*a*. The certificate transaction Tx comprises one or more inputs and one or more outputs. At least one input 1501*a* comprises a digital signature of the registration authority. That is, the registration authority has a first private key (e.g. a first private-public key pair) from which a digital signature can be generated, and the registration authority uses that digital signature to sign the transaction. An example certificate format is illustrated in FIG. 16*b*. By signing the certificate transaction, the registration authority attests to the data contained in the output(s) of the transaction. The digital signature can only be generated by the registration authority who has knowledge of the first private key. The transaction also has an first output 1502*a* (e.g. an unspendable output) which comprises a digital certificate issued by the registration authority to the requestor. The digital certificate includes an identifier assigned to the requestor. The identifier is unique to the requestor within the IoT network 501. The requestor is assigned an identifier which must remain fixed once issued and will appear in any certificates which the device is issued with. Preferably the device identifier is assigned at the time the certificate is generated. However, it is not excluded that the requestor already has a device identifier, which is then certified by way of inclusion in the certificate.

Once generated, the registration authority transmits the certificate transaction to one or more nodes 104 of the blockchain network 106 to be recorded in the blockchain 150. Once recorded in the blockchain 150, the requestor can use the certificate to prove to other nodes or devices of the network 501 that the requestor has been granted permission to join the network 501. For instance, when communicating with other nodes 503 of the network 501, the requestor can include information identifying the certificate transaction and thus the certificate.

Referring to FIGS. 1 to 3, in these examples the first node may be the computer equipment 102*a* of Alice 103*a* and the second node may be the computer equipment 102*b* of Bob 103*b*.

If the requestor is node 503 of the network 501 (or is requesting permission to join the network 501 as a node), the certificate may comprise a unique public key assigned to that node. The public key allows the requesting node 503, once they have joined the network 501, to transmit and receive blockchain transactions.

A private key is a secret numerical value known only to the owner of the private key. For example, the private key may be a 256-bit string. A public key is the associated public value that is derived from the private key and can be shared. For example, the public key may be calculated by elliptic curve multiplication of the private key by the secp256k1 elliptic curve generator point. The signature may a cryptographic signature such as, for example, one generated using an elliptic curve digital signature algorithm (ECDSA). Alternative signature schemes may be used, e.g. Rabin signatures.

The certificate transaction may comprise a second output 1502*b* which is locked to a second public key of the registration authority. The second public key may be the same as the public key used to generate the signature that signs the certificate transaction, or it may be a different public key. The second output 1502*b* is locked to the second public key in the sense that the knowledge of the second public key is required to unlock the output. For instance, the second output may comprise a hash of the second public key, and in order to be unlocked by an input of a later transaction, that input must comprise the second public key. When the second output 1502*b* is executed alongside an input of the second transaction, the second public key provided in the input is hashed and compared with the hash contained in the second output 1502*b*. If the two hashes match, the second output 1502*b* may be unlocked (provided any additional constraints have been met).

An output may be locked to a public key via a pay-to-public-key-hash (P2PKH). A P2PKH is a script pattern that locks an output to a public key hash. P2PKH outputs can be spent if a recipient provides a signature valid against a public key matching the public key hash. That is, a P2PKH output challenges the spender to provide two items: a public key such that the hash of the public key matches the address in the P2PKH output, and a signature that is valid for the public key and the transaction message, not necessarily in that order.

As the second output 1502*b* is locked to a public key of the registration authority, only the registration authority can revoke the certificate. This prevents the certificate being revoked from a malicious party.

The second output 1502*b* may be time-locked to the second public key. An output that is time-locked cannot be unlocked until after a predetermined period of time. For example, the registration authority may include a lock time in the certificate transaction. The lock time prevents the second output 1502*b* of the certificate transaction from being successfully spent by a later transaction until after a certain time (which may e.g. be specified by a Unix time or a block height). The lock time may be implemented using an "nLocktime" field of the transaction. nLocktime is a parameter of a transaction that mandates a minimal time before which the output can be spent. In combination with nLocktime, an opcode (e.g. OP_CHECKLOCKTIMEVERIFY (CLTV)) will prevent a later transaction from spending the second output (by causing script execution to fail) unless the nLockTime on the first transaction is equal to or greater than the time parameter provided to the opcode. Since the later transaction may only be included in a valid block if its nLockTime is in the past, this ensures the CLTV-based timelock has expired before the later transaction may be included in a valid block.

Additionally or alternatively, the second output 1502*b* may be a "multi-signature" output. A multi-signature output is locked to multiple public keys, i.e. the second public key of the registration authority and at least one other public key. The other public key could be that of another node of the network 501, or a third party node outside of the IoT network but within the blockchain network 106. An input of a later transaction attempting to spend the second output 1502*b* must contain multiple signatures, one for each public key to which the second output is locked.

A time-lock prevents the registration authority from revoking the certificate before an agreed upon time, or without the permission of a different node (e.g. the master node). A multi-signature output prevents the certificate from being revoked without permission of a different node (e.g. the master node). Both techniques enforce a minimum certificate duration length.

Each transaction, when recorded in the blockchain 150, can be identified by a unique transaction identifier TxID. A transaction identifier may be generated by computing the (double) SHA256 hash of the serialised transaction bytes. Other hash functions may be used instead of SHA256. The registration authority may transmit a transaction identifier of the certificate transaction to the requestor. This allows the requestor to identify the certificate transaction and therefore obtain the certificate within the certificate transaction. Alternatively, the requestor may listen for transactions transmitted to the blockchain 150 from the address of the registration authority.

If the requestor is joining the network 501 as a node (e.g. a servant node), the requesting node may use the transaction identifier to obtain the first public key of the registration authority and identify one or more further transactions (i.e. further certificate transactions) sent from that first public key. The further transactions may each comprise a respective certificate of one or more further nodes or devices of the network 501. The requestor may then obtain (e.g. download and save) those certificates. The information within the certificates (e.g. device identifier and/or public key) may be used to communicate with other nodes 503 and/or devices 502 of the network 501. For example, the requestor may transmit a blockchain transaction to another node 503 using that node's certified public key, e.g. by including an output in the transaction locked to the certified public key (e.g. a P2PKH output). When receiving a command, the requestor can use the certificates to check whether the command has been issued from a permissioned node 503 or device 502.

If the requestor is joining the network 501 as an end device 502 that cannot access the blockchain, the registration authority may transmit the certificate to the end device, e.g. over a wired connection or a wireless connection such as, for instance, Bluetooth, Wi-Fi, etc. The registration authority may also transmit a set of one or more second certificates to the requesting end device 502. These second certificates, each issued to a respective node or end device of the network 501, can be used to ensure that the requesting end device's communication is to and from permissioned nodes 503 and devices 502.

Each certificate (first and second) may comprise a network address (e.g. an IP address) of the node 503 or end device 502 to which the certificate is issued. The requestor can use the network address of a permissioned (i.e. certified) node to communicate with that node, e.g. to send a sensor reading or command acknowledgement.

The registration authority may transmit the certificate issued to the requestor to one or more nodes and/or end devices of the network 501. Those end devices may use the certificate to communicate with the requestor and to verify whether the requestor has been granted permission to join the network 501.

In order to prevent third parties from viewing the contents of the certificate (which may contain sensitive information), the registration authority may encrypt the certificate. For instance, the certificate may be encrypted using an encryption key based on a public key of the registration authority (which may or may not be the same as the first and/or second public keys of the registration authority). Alternatively, the encryption key may be a random number generated by the registration authority.

In some examples the registration authority, the registration authority may simply issue certificates to requestors, i.e. without receiving an explicit request. In other examples, the requestor may first transmit a request to the registration authority. The request may be include one or more credentials of the requestor. For instance, the credentials may include one or more of the following: a device type (e.g. laptop, phone, oven, fridge, etc.), node type (e.g. master node, servant node, slave node, end device), network address (e.g. IP address, which may be an IPV6 address), etc. The registration authority or a different node (e.g. the master node) may validate the request. If validated, the registration authority may generate and the first transaction and transmit it to the blockchain network 106. If the request is not granted, the registration authority may not generate the transaction.

In some instances, a certificate issued to a requestor may need to be revoked. For example, the requestor may have been compromised, or may have developed a fault. In order to revoke the certificate, the registration authority generates a second blockchain transaction (a "revoke transaction"). The revoke transaction has an input that references the second output of the certificate transaction (i.e. the output locked to the second public key of the registration authority). The input comprises a signature linked to the second public key. If the second output of the certificate transaction is a P2PKH output, the input of the revoke transaction must comprise a public key such that the hash (e.g. OP_HASH160) of the public key matches the public key hash in the P2PKH output. A P2PKH output challenges the spender to provide two items: a public key such that the hash of the public key matches the address in the P2PKH output, and a signature that is valid for the public key and the transaction message, not necessarily in that order.

The revoke transaction may comprise one or more outputs, e.g. an output locked to a third public key of the registration authority (which may or may not be the same as the first and/or second public key of the registration authority). The registration authority then transmits the revoke transaction to the blockchain network 106 to be recorded in the blockchain 150. Once the revoke transaction is recorded in the blockchain 150, the certificate transaction will be removed from the unspent transaction output (UTXO) set. A UTXO is an output from a blockchain transaction that has not been spent by another blockchain transaction. When a different node on the network 501 attempts to identify a certificate issued to the requesting node, that node will find that the certificate transaction comprising the certificate has been spent, and interpret this as the certificate being revoked. Nodes of the network 501 are able to dynamically update their peer-list (i.e. a list of permissioned/certified nodes) by watching the transaction generated from and to the issuing address (i.e. the second public key).

The validity of a node/device certificate may depend on three criteria: the issuing key is the recognised issuing key (contained in the certificate signed by the master key), the certificate is correctly formatted according to a predetermined protocol, and the spendable output in the certificate transaction is unspent. Certificates can be updated once they have been revoked. The registration authority spends the UTXO in the old certificate then creates a new certificate Tx with updated information. The registration authority can then broadcast the new certificate outpoint location index to the devices on the IoT network 501. This also applies to the registration authority's own (self-signed) certificate.

As discussed above, the certificate comprises a unique identifier of the requestor. The certificate may also comprise a unique public key of the requestor. In general, the certificate may comprise one or more of the following fields:

| Field size (bytes) | Field name | Data type | Description |
|---|---|---|---|
| 4 | IOT protocol identifier | uint32_t | Prefix indicating the protocol |
| 1 | Payload type | uint16_t | Single-byte identifier indicating whether the message is a regular message or a certificate. |
| 32 | New device ID | char[32] | Unique device ID for the new device |
| 33 | New Device Pubkey | char[32] | secp256k1 (compressed) public key used to communicate with node (if on Blockchain P2P network) |
| 4 | Device type | uint16_t | Device type (e.g. laptop, phone, oven fridge, lamppost etc.) |
| 4 | IOT Node type | uint16_t | Node type e.g. Master, Servant, Slave, End device |
| 16 + 2 | IPv6 Address + Port | Char[16] | IPv6 Network address. Network byte order. |
| 4 | UNIX Time creation date | uint16_t | Device creation date |
| 4 | UNIX Time certificate expiry date | uint16_t | UNIX time of when the certificate expires, and a new certificate will have to be issued |
| 0-80 | Additional device information | char[ ] | Additional device information (including manufacturer information). |

A certificate of this format requires one-hundred and four to one-hundred and eighty-four bytes of data, e.g. encoded in an unspendable (OP_RETURN) output of a blockchain transaction.

As mentioned above, the network 501 may comprise a master node 503. In some examples, the registration authority may comprise the master node 503*a*. The requestor may be a node 503 or an end device 502. Therefore, the master node 503*a* may itself issue certificates to the nodes 503 or devices 502. In additional or alternative examples, the requestor may be the master node 503*a*. If the master node 503*a* is both the registration authority and the requestor, the master node 503*a* self-signs its own certificate.

Access to the IoT network 501 is permissioned and uses a permissioning (or bootstrapping) algorithm to authorise new entities (nodes or devices). Two example algorithms are provided below. The master node 503*a* may be controlled by a registration authority which can (either directly or indirectly) verify the credentials of any new device requesting permission to be allowed onto the network 501. The master node 503*s* can then issue an on-chain certificate which will be broadcast to all other nodes 503 on the network 501. The bootstrapping algorithm for devices that do not operate blockchain wallets is different as it relies on communication between IP addresses instead of via blockchain transactions.

Example Permissioning Algorithm (Master/Servant/Slave)

Step 1: A computing device running a node registers its credentials, including all relevant manufacturing information with a registration authority. The registration authority can be the same entity operating the master node 503*a*. However, the public key used to sign regular commands or messages should preferably be different to the public key used to sign the certificate transaction.

Step 2: The registration authority, which has control over the key $PK_{Issue}$, validates the authenticity of the credentials and determines if the device should be authorized to enter the IoT network 501.

Step 3: If the device is authorized the registration authority creates a unique certificate transaction for the node. This transaction is broadcast from $PK_{Issue}$ to the $PK_{Issue}$ address. The registration authority sends a TxID to the new node.

Step 4: The new node finds the transaction and identifies $PK_{Issue}$ with the registration authority. The new node downloads and verifies all certificates that have been issued by $PK_{Issue}$ and are currently active.

Step 5: Servant and slave nodes already on the network 501 are configured to listen for transactions broadcast to and from $PK_{Issue}$. Once they have seen the new transaction, downloaded and evaluated the new device certificate they can configure their wallets to communicate with the new node.

Example Permissioning Algorithm (End Device)

Step 1: An end device 502 registers its credentials, including all relevant manufacturing information and IP address with the registration authority. Again, the registration authority can be the same entity operating the master node 503*a*. However, the public key used to sign regular commands or messages should preferably be different to the public key used to sign the certificate transaction.

Step 2: The registration authority, which has control over the key $PK_{Issue}$, validates the authenticity of the credentials and determines if the device 502 should be authorized to enter the IoT network 501.

Step 3: If the device 502 is authorized the registration authority creates a unique device certificate transaction for the device. This transaction is broadcast from and to addresses controlled by $PK_{Issue}$. The certificate data is encrypted so that only IOT nodes can see details.

Step 4: The registration authority sends a list of certificates that enable the end device 502 to create a peer-list. This list will allow the end device 502 to connect to other nodes 503*c* on the network 501 and interpret the public key hierarchy.

Step 5: The nodes 503 on the network 501 will be able to see the device certificate and can communicate with the end devices IP to IP (TLS).

Request & Response Protocol

The present disclosure also provides for a protocol for nodes of a network (e.g. an IoT network) 501 to use blockchain transactions Tx to issue command requests, instruct devices based on those command requests and issue command acknowledgements. Whilst embodiments will be described with respect to an IoT network 501, in general, the teaching of the present disclosure could be applied to any network comprising nodes which operate a blockchain protocol client application 105, and end devices controllable by at least a subset of those nodes.

A first bridging node 503 of the network 501 (e.g. master node 503*a*, or server node 503*b*) generates a first transaction $Tx_1$ which comprises an input signed by the first node and an output comprising command data. The command data comprises an identifier of an end device 502 to be controlled and a command message for controlling the end device 502. The first node may be the originator of the command. That is, the first node may generate the command data.

The first node may transmit the first transaction $Tx_1$ to a second bridging node 503 of the first network 501 (e.g. slave node 503*c*) that controls the end device 502. The first transaction $Tx_1$ may be transmitted off-chain, i.e. without being transmitted to the blockchain. For instance, the first transaction $Tx_1$ may be sent directly from the first node to the second node, e.g. over the internet. For example, the first node may be a server node 503*b* and the second node may be a slave node 503*c*. Alternatively, the first transaction $Tx_1$ may be sent indirectly, e.g. via one or more intermediary nodes. As an example, the first transaction $Tx_1$ may be sent from a master node 503*a* to a slave node 503*c* via a server node 503*b*. The second node may be connected to the end device 502 via a wired or wireless connection, e.g. via an Ethernet or Wi-Fi connection.

Additionally or alternatively, the first node may transmit the first transaction $Tx_1$ to the blockchain network 106 to be recorded in the blockchain 150. This relies on the first transaction $Tx_1$ being a valid transaction. As discussed below, in some cases it is preferable not to transmit the first transaction $Tx_1$ to the blockchain.

Referring to FIGS. 1 to 3, in these examples the first node may be comprised by the computer equipment 102*a* of Alice 103*a* and the second node may be comprised by the computer equipment 102*b* of Bob 103*b*. As explained previously, Alice and Bob may use a side channel (e.g. side channel 301) to exchange a transaction without the transaction (yet) being published onto the blockchain network 106 or making its way onto the chain 150, until one of the parties chooses to broadcast it to the network 106.

The second node may obtain the first transaction $Tx_1$ directly or indirectly from the first node, e.g. the first transaction $Tx_1$ may be forwarded to the second node via one or more intermediary nodes. The second node uses the command data to transmit a control instruction to the end device 502 identified by the device identifier ("Device ID") in the command data. The control message in the command data may define a desired action of the end device 502. The control message may be configured to cause the second node to transmit a particular one of several possible instructions to the end device 502. Alternatively, the second node may be configured to send a single instruction to the end device 502, i.e. the second node only ever sends the same instruction to the end device. This may be the case, for instance, if the end device 502 is a simple device like a sensor, and the instruction is a request for a sensor reading.

The command (i.e. the instruction for the end device) may be transmitted to the device off-chain over a wired or wireless connection, e.g. using Wi-Fi. Alternatively, if the device is also a node of the network, the command may be transmitted via a blockchain transaction Tx.

In some embodiments, a request and response cycle for device and controller communication may be implemented by the first and second nodes. The request (command) is issued as a partially complete transaction containing an output which comprises the command data (e.g. an OP_RETURN payload). The response (acknowledgment of the command) is the broadcasting of a finalised transaction containing the signature of both the requester and responder nodes. Transaction malleability enables this method of communication as the message receiver can add inputs and outputs whilst unable to alter the command data (e.g. the OP_RETURN payload).

An opcode is an instruction syllable or parcel used within a script engine 402 to instruct miners 104M to perform stack-based operations and cryptographic operations on data. Here, a script engine 402 is an execution environment used to validate the script within a blockchain transaction Tx, and a stack 403 is a data structure (a collection of elements) with two principal operations: 'push' which adds an element to the collection and 'pop' which removes the most recently added element. Opcode are designed to perform operations on the stack elements. When validating a transaction Tx, the script engine 402 will not execute any data in an output script (ScriptPubkey) after an OP_RETURN opcode. In practice this means that the remaining script data can be arbitrary and the output itself is unspendable (in one blockchain protocol, an OP_RETURN needs to be preceded by an OP_FALSE opcode to ensure non-spendability of the output).

The first transaction $Tx_1$ transmitted from the first node to the second node may be transmitted without a second output. I.e. the transaction comprises a single output (the output comprising the command data). In order to complete the partial transaction, the second may update the transaction by adding an input and an output to the first transaction. The input comprises a signature of the second node, i.e. a signature generated using a private key of the second node. The output is an output locked to a public key of the second node, e.g. a P2PKH output. To spend a P2PKH output, an input of the spending transaction must comprise a public key such that the hash (e.g. OP_HASH160) of the public key matches the public key hash in the P2PKH output. A P2PKH output challenges the spender to provide two items: a public key such that the hash of the public key matches the address in the P2PKH output, and a signature that is valid for the public key and the transaction message, not necessarily in that order. The public key may correspond to the private key used to generate the signature. Alternatively, the signature may be linked to a first public key, and the output may be locked to a different public key. The second node may then transmit the completed transaction to the blockchain network 106. The completed transaction (referred to as a command transaction in these embodiments) is available in the blockchain 150 for other nodes to view, e.g. the first node, and acts as a record of the command carried out by the device. That is, once a transaction is broadcast, an independent observer can see which public key issued the command/message and which public key responded to it.

FIGS. 7*a* and 7*b* illustrate an example partial first transaction $Tx_1$ (partial) and an example updated first transaction $Tx_1$ (complete). The partial first transaction comprises a single input 701*a* and a single output 702*a*. The updated first transaction includes the input 701*b* and output 702*b* added by the second node. A SIGHASH_SINGLE signature type can be used to achieve the desired level of transaction malleability. For example, a node with public key $PK_0$ sends an instruction to a node with public key $PK_1$. The instruction is encoded in an unspendable output (e.g. an OP_RETURN output) of a transaction signed using SIGHASH_SINGLE signature type (FIG. 10*a*). The partially complete transaction is valid. On completion of the instruction, the second node with $PK_1$ adds an output locked to their address. The second node with $PK_1$ then finalises the transaction by signing the entire transaction using SIGHASH_ALL signature type (see FIG. 10*b*).

In alternative embodiments, the first transaction $Tx_1$ transmitted from the first node to the second node may be transmitted with a second output. The second output is locked to a public key of the second node. For example, the second output may be a P2PKH to the second node's public key.

In order to complete the first transaction $Tx_1$, the second node updates the first transaction by adding an input to the first transaction. The first transaction $Tx_1$ now includes two inputs and two outputs. The second input comprises a public key of the second node. The public key in the second input may or may not be the same as the public key to which the second output is locked. Once completed, the updated first transaction (referred to as a command transaction in these embodiments) is sent to the blockchain network 106 for inclusion in the blockchain 150. Once a command transaction is broadcast any independent observer can see which public key issued the command/message and which public key responded to it.

The second output locked to the public key of the second node may transfer an amount of the digital asset which is greater than the amount of the digital asset referenced by the first input of the first transaction. In that case, the first transaction $Tx_1$ is a partially complete transaction that would not be deemed valid by other nodes of the blockchain network 106. That is, the first transaction $Tx_1$ would not satisfy the consensus rules followed by the blockchain nodes and thus would not be mined into a block 152 of the blockchain 150. When updating the first transaction $Tx_1$, the second node would have to ensure that the combined amount of digital asset referenced by the first and second inputs is greater than the amount of the digital asset locked to the second output.

FIGS. 8*a* and 8*b* illustrate an example partial first transaction $Tx_1$ (partial) and an example updated first transaction $Tx_1$ (complete). The first transaction includes the command data in a first output 802*a* and a second output 802*b* locked to the public key of the second node. The updated first transaction includes the additional input 801*b* added by the second node. If the first node with $PK_0$ sends an instruction to the second node with $PK_1$ that they want carried out by the second node with $PK_1$ only, they can send a partially complete transaction which locks both outputs 802*a*, 802*b* but does not pay a fee (and therefore will not be mined or propagated). In order to redeem the digital asset locked to $PK_1$, the second node with $PK_1$ will need to provide an input 801*b* that pays the fee. To issue a command using a partially complete transaction, the SIGHASH flag for $<Sig_{PK_0}>$ is set to SIGHASH_ANYONECANPAY and contains an OP_RETURN output with the command data. This means that, whilst the command data included in the first output 802*a* is fixed, anyone can add an additional input. The public key that received the command can add an additional input 801*b* to redeem the funds in the input 801*a*. To secure the new input 801*b* and prevent further transaction malleability the receiver of the funds adds a minimal value (dust) input and signs the transaction outputs using SIGHASH_ALL.

Note that a SIGHASH flag is a flag added to signatures in transaction inputs to indicate which part of the transaction the signature signs. The default is SIGHASH_ALL (all parts of the transaction other than the ScriptSig are signed). The unsigned parts of the transaction can be modified.

Figure 9:
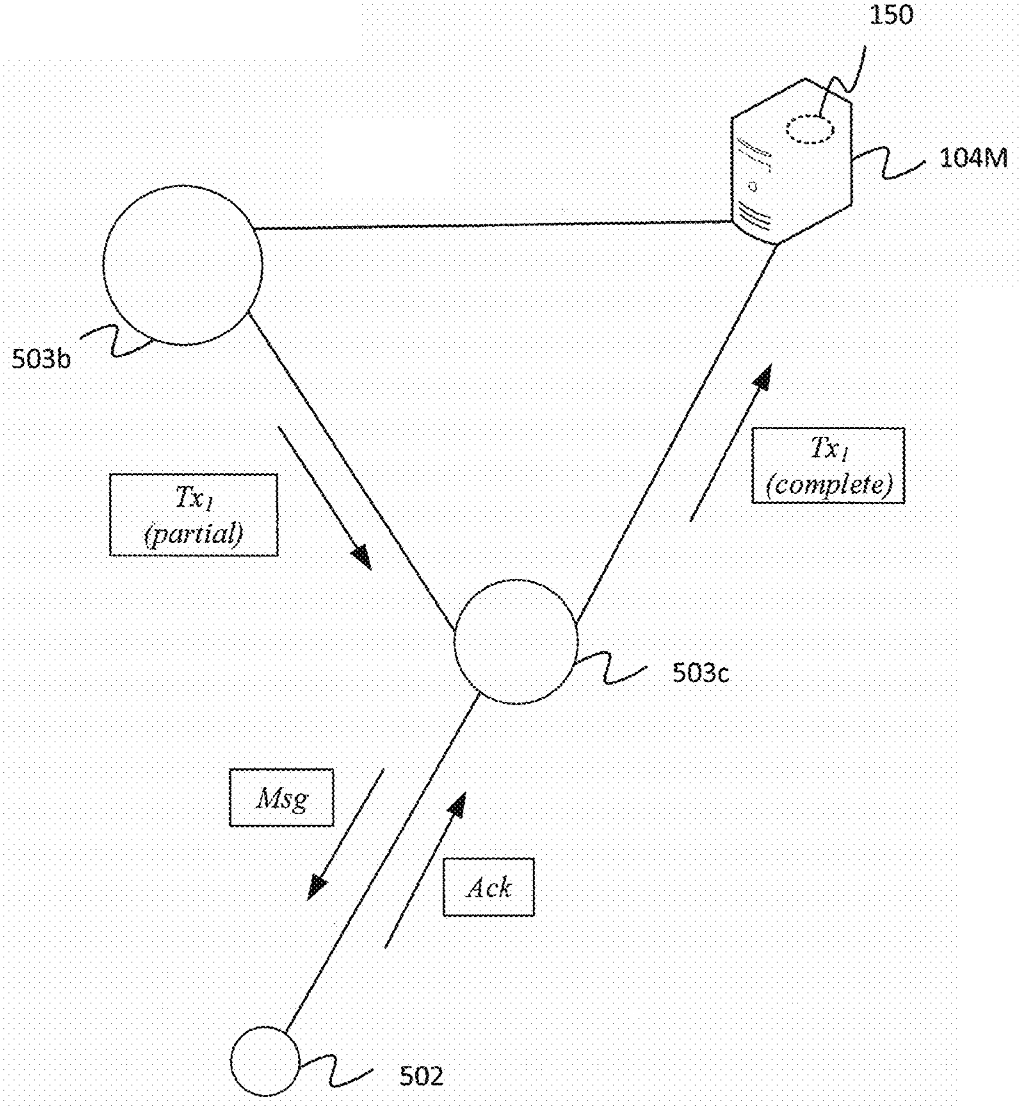
FIG. 9 schematically illustrates a command request and response cycle.

An example request and response algorithm is provided below, with reference to FIGS. 9, 10*a* and 10*b*. A controlling device 503*b* is configured to communicate with other nodes on the network 501 and can calculate the shortest route of communication to any other node on the network. For example, $PK_{serv}$ identifies that $PK_{slave}$ is the nearest controller to a device with device_ID.

Step 1: A controlling device 503*b* with public key $PK_{serv}$ sends a partial command $Tx_1$ (see FIG. 10*a*) to a second controlling device 503*c* with public key $PK_{slave}$. The IoT message contained in the transaction specifies the command and target device with device_ID.

Step 2: The second controlling device ($PK_{slave}$) checks that the signature for the transaction is valid and that the message contained within the IoT message payload is valid in accordance with the rules of the network 501.

Step 3. The second controlling device ($PK_{slave}$) sends a command message ("Msg") to the device (device_ID) via off chain communication (e.g. wired connection, Bluetooth, IP-to-IP).

Step 4: Upon completion of the command requested action, the device (device_ID) sends a command completion or acknowledgment message ("ack") back to the second controlling device ($PK_{slave}$).

Step 5: The second controller ($PK_{slave}$) adds a second input and signature and finalises the transaction (see FIG. 10*b*). This will signal that the second controller confirms the completion of the command.

Step 6: The second controller ($PK_{slave}$) broadcasts the finalised transaction to the blockchain (mining) network 504.

In some embodiments, rather than being a transaction, the first transaction $Tx_1$ may be a command request transaction $Tx_1$ (request). That is, the first node may transmit a request to two or more nodes of the network for approval to control an end device 502. For example, the first node may be a server node 503*b* requesting approval from the master node 503*a* and a different bridging node 503 (e.g. another server node 503*b*). The first transaction $Tx_1$ includes the command data, which includes the command message for controlling the end device 502. However, instead of transmitting the first transaction $Tx_1$ to a node that controls the end device 502, the first node transmits the first transaction $Tx_1$ to two or more nodes which can approve command requests. That is, the first node includes an output locked to two or more nodes of the network 501. In order to unlock the output, a signature from each node must be provided in an input of a later transaction $Tx_2$. The first transaction $Tx_1$ is broadcast to the blockchain network 160 for inclusion in the blockchain 150. When the two or more nodes see the transaction $Tx_2$ (by listening for transactions paid to their public keys, or public key addresses), the two or more nodes, if they want to approve the command request, each sign an input of a command approval transaction $Tx_2$ (approval) and broadcast that transaction $Tx_2$ to the blockchain network 106. The command approval transaction $Tx_2$ includes the same command data as the command request transaction $Tx_1$, and an additional output locked to the public key of the second node that controls the end device 502.

FIGS. 11*a* and 11*b* illustrate an example first and second transaction, the first transaction $Tx_1$ being a command request transaction and the second transaction $Tx_2$ being a command approval transaction. The first transaction $Tx_1$ comprising an input 1101*a* signed by the first node, a first output 1102*a* comprising the command data and a second output 1102*b* locked to two different public keys: one of a third node, and one of a fourth node (also bridging nodes 503 of the IoT network 501). The second transaction $Tx_2$ comprises an input 1101*b* signed by the third and fourth nodes, the first output 1102*a* and a second output 1102*c* locked to the public key of the second node. Multi signature scripts enable multi-factor approval for commands. In some cases, the interpretation of commands or validation of certificates may require signatures from two or more nodes (e.g. nodes of the IoT network). It also may require checking whether the spendable output is in the UTXO set. For example, a first node with public key $PK_0$ may want to instruct a second node with public key $PK_3$ to perform an action. As a security requirement this command requires that third and fourth nodes with public keys $PK_1$ and $PK_2$ respectively approve. The first node with public key $PK_0$ creates a first transaction that sends funds to a multisignature address. The first transaction also contains the command data (encoding the command to $PK_3$) needing approval. In response, nodes 503 with public keys $PK_1$ and $PK_2$ have the option of spending funds from the multisignature address if both provide a signature. Approval is interpreted as the spending of the output in the command request transaction. Whilst these figures show a two-of-two pay to multi-sig (P2MS) output, in general, the P2MS output can to be an n-of-n output, where n is any integer and P2MS is a type of script pattern that allows a payer to lock an output to multiple addresses. In order to be spent the output may require one or more signatures from a specified set of public keys.

In some embodiments, as discussed above, the first node may generate the command request transaction $Tx_1$. Additionally or alternatively, the first node may generate a command approval transaction $Tx_2$ in response to a command request transaction generated by a different node of the IoT network 501. For instance, the first node may be a master node 503*a* which can grant approval to requests. In that case, the blockchain 150 comprises the command request transaction which comprises an output locked to a public key of the first node and one or more respective public keys of one or more further nodes 503 of the IoT network 501. For example, the first node may be a node which approves commands issued to an end device 502 controlled by the second node. If the first node approves of the command, the first node signs a command approval transaction which references the output of the command request transaction. If the first node is the last node to sign the command approval transaction, the first node transmits the transaction to the blockchain network 106. The broadcast transaction $Tx_2$ is interpreted as being an approval of the command request.

When the second node (e.g. a slave node) obtains a command transaction, or a command-approval transaction, the second node transmits a command (Msg) to the device identified by the device identifier (Device_ID) in the command data. In some examples, the device 502 may transit an acknowledgement message (Ack) to the second node to indicate that it has received the command and/or that it has actioned the command. In these examples, the second node may only update the first transaction (and then broadcast the updated transaction) on condition that it has received an acknowledgement from the device. This provides further supporting evidence of the end device has executed a command.

Due to resource constraints that most everyday small electronic devices have, they may not be able to easily monitor the blockchain 150 and/or even communicate with IoT network components outside of their immediate location, and therefore the control of end devices 502 is performed locally (second node to device) and off-chain. Messages to and from end devices may take the form of the raw command data (e.g. OP_RETURN payloads) without the additional transaction metadata. This ensures that the data packets containing the messages remain small and computationally intensive operations (such as elliptic curve mathematics) are not required.

In some embodiments, the command data included in the transactions is encrypted. The command data may be encrypted with an encryption key based on a random number, though preferably the encryption key is generated based on a public key of the first node and a public key of the second node. The public key of the first and/or second node may be certified public keys (certified public keys are discussed below). Certified public keys are included in a respective certificate issued to the first and/or second nodes. These public keys may be different to the public keys used by the first and second node to generate and update the first transaction. That is, the public keys used to generate signatures or to lock outputs of a transaction (the "transaction public keys") may not be the same as public the keys used to generate the encryption key. In other examples, the transaction public keys may be used to generate the encryption key.

The encryption key used to encrypt the command data may be generated independently by the first and second nodes. For example, the first node may generate the encryption key based on a private key known to the first node and the second node's public key. The second node may generate the encryption key based on a public key corresponding to the first node's private key and a private key corresponding to the second node's public key. This ensures that both the first and second nodes can decrypt the command data, e.g. so that the second node can access the command message to instruct the device.

Optionally, the output of the first transaction which comprises the command data may include the encryption key used to encrypt the command data. The encrypted key may be encrypted with a second, different encryption key. A party who knows the second encryption key can decrypt the encrypted encryption key, and then decrypt the encrypted command data. For example, it may be beneficial for an entity such as the master node to be able to view all command messages transmitted to and from nodes of the network. The second encryption key may be generated based on a public key of the first node and a public key of a different node, e.g. the master node. The public key of the first node may be the first node's certified key or a transaction public key. Similarly, the public key of the master node may be the master node's certified key or a transaction public key.

The encryption may be symmetric. Symmetric encryption provides the same level of privacy for on-chain data as HTTPS does for communication over the internet. To do this the master node creates a secret encryption key that is used to encrypt all regular messages between nodes on the local IoT network. Each IoT transaction OP_RETURN payload (i.e. the output comprising the command data) may have two data chunks. First, A BIE1 ECIES encrypted IoT message, where the encryption key is derived using the (certified) public keys of request and response devices (end-to-end). Secondly, a BIE1 ECIES encrypted encryption/decryption key for the IoT message. Elliptic Curve Integrated Encryption Scheme (ECIES) is an encryption scheme based on a Diffie-Hellman exchange. The second encryption key (used to encrypt this data push) is derived using the master and requester public keys. An additional byte push is added to the end of the encrypted payload containing the decryption key for the IoT message, itself encrypted using BIE1 between the request node and the Master. This ensures that the master node is able to view the decrypted data sent between devices on the network. Other encryption techniques may be used, e.g. American Encryption Standard (AES) encryption.

FIGS. 12*a* and 12*b* illustrate the described command and response transactions with encrypted payload data.

As mentioned above, the first and second node may use transaction public keys when generating and updating transactions. Whilst public keys are used to identify nodes on the IoT network, preferably those public keys should not used for signing transactions. E.g. each node may have a public key contained in a certificate issued by a registration authority. Owners of certified keys (e.g. public keys with corresponding certificates signed by the master node) can derive shared secrets that mask their identities to third parties and can be used to sign transactions.

As discussed above, the IoT network 501 may comprise a master node 503*a*. The master node 503*a* may obtain (e.g. generate) a seed key and then generate a set (e.g. a plurality) of private keys, each based on the seed key. The master node 503*a* may then transmit the set of private keys (referred to below as joint private keys) to the nodes of the network (e.g. server and slave nodes). Each node receives the same set of joint private keys, but not the seed private key.

Each node has a respective main private key, e.g. a private key corresponding to that node's certified public key. Each node, including the master node 503*a*, uses the set of joint private keys to generate a set of corresponding secondary (or transaction) private keys. The transaction private keys are generated by adding the respective node's main private key to each joint key. For each node, a set of corresponding transaction public keys may be generated from the set of transaction private keys.

The first node may the master node 503*a*, i.e. the node that generates the set of joint private keys. Alternatively, the first node may be an intermediary node (e.g. server or slave node) which receives the set of joint private keys from the master node. In some examples, each node may use a transaction public key only once.

An example key-masking algorithm for generating transaction keys from a certified key is provided below. Nodes 503 on a local IoT network 501 have all been issued certificates that register a public key. Specifically, a server node has certified key $PK_{Serv}$ and a master node has certified key $PK_{Master}$ with private key $sk_{Master}$.

Step 1: The master node 503*a* generates a master extended private key $m^{joint}$ from a seed. m will be used to generate a wallet of keys that will be shared across the IoT network 501 and used to mask each nodes address. The joint wallet has indexed keys:

$$sk_{i,j}^{joint},\ PK_{i,j}^{joint} = sk_{i,j}^{joint} \cdot G.$$

Step 2: The master node 503*a* uses off-chain end-to-end encryption scheme (e.g. BIE1 ECIES) to share m with nodes other nodes on the IoT network in an off-chain message.

Step 3: Once the server node 503*b* obtains m he can derive a set of hierarchical deterministic key pairs in the wallet.

Step 4: Each node 503 on the network 501 generates their wallet private keys by adding the private key from their certified key pair to the private keys generated from the joint wallet. For example, the master node generates the transaction signing keys, $$s_{i,j}^{M}$$

where $$sk_{i,j}^{M} = sk_{i,j}^{joint} + sk_{Master}$$

Step 5: Each node 503 can identify all the payment endpoints (addresses) for other nodes 503 on the IoT network 501 by adding other nodes public keys to public keys from the joint wallet. For example, the server node 503*b* can derive the master node's payment address public keys, $$PK_{i,j}^{M},$$

where $$PK_{i,j}^{M} = PK_{i,j}^{joint} + PK_{Master}.$$

Each node 503 on the IoT network 501 can derive its own wallet and monitor the addresses of other devices if they know m and the location of relevant IoT certificates.

Both encryption and key masking protect device activity data from being leaked third parties whilst still ensuring device visibility for all nodes 503 on the local IoT network 501.

Each transaction transmitted by nodes 503 of the IoT network 501 includes an output comprising command data. The output and/or the command data may comprise a protocol flag to indicate that the output comprises command data. This enables IoT devices and independent third parties to identify when an on-chain command, action or status update has occurred.

FIG. 13 illustrates an example command data output of a first transaction. The first transaction comprises an input (not shown) comprises a signature of the first node and an output 1301 comprising the command data. The first transaction may also comprise a second output (not shown), which will be discussed below. In this example, following the protocol identifier (4 bytes) is a ninety-three-byte payload containing IoT communication information. The communication information includes a thirty-two-byte device ID of the intended recipient of the command instruction, the location of the device certificate, commands and the device status. In some examples, every transaction that issues a new command or status update must follow this format or it will be considered an invalid command. If a field is not necessary for any on-chain message, its bytes may be set to 0x00000000. Preferably, as discussed below, the payload data itself will be encrypted. The payload data can then only be accessed by parties that hold the decryption keys. The table below describes the fields of an example IOT message payload.

| Field size (bytes) | Description | | Data type | Comments |
|---|---|---|---|---|
| 4 | IOT protocol identifier | | uint32_t | Prefix indicating the IOT protocol |
| 1 | Payload type | | uint16_t | Single-byte identifier indicating whether the message is a regular IOT message or a certificate. |
| 4 | Software version number | | uint32_t | IOT version number (necessary for protocol updates/upgrades) |
| 32 | Device ID | | char[32] | The unique device ID for the device subject to the command/message |
| 40 (32 + 4 + 4) | Device certificate location | TXID | char[32] | Transaction ID of the transaction containing the device certificate |
| | | VOUT | uint16_t | Revocation UTXO location within certificate TX |
| | | VOUT | uint16_t | Output number of the certificate payload |
| 4 | Command/message | | uint32_t | String encoding the command or message directed to the device w/device ID |
| 4 | Status | | uint16_t | The current device status |
| 4 | Previous Status | | uint16_t | The device's most recent previous status |

A device state replica is the logical representation of a device's reported state, or desired state. Within the IoT message the device state information is encoded in the Device ID, Status and Prev. Status. The latest transaction relating to the device ID represents the current device status. The messages containing commands, responses and data related to the status of devices is contained in timestamped blocks on the blockchain, secured using public key cryptography and proof of work.

In summary, nodes 503 on the IoT network 501 communicate directly using transactions containing IoT command data, as well as by connecting to the blockchain network 106 to broadcast transactions. The blockchain 150 is used as a permanent data store for recording commands and status updates from IoT network components as well as issuing reports and alerts related to IoT devices 502. The protocol may make use of one or more of the following features.

Request and response messaging system—A request and response system for receiving and acknowledging commands is used. Requests are offline (peer-to-peer) transactions encoding IoT logic that can be interpreted by the end device. Responses or acknowledgements are interpreted from the visibility of the transaction on the blockchain network 106.

Offline transaction propagation—Instructions encoded into transactions are sent directly (peer-to-peer). Master, server and slave nodes can independently verify the source of the transaction by verifying the transaction signature. This also serves as a method of payment for controllers.

Direct communication between nodes and end devices—If the instruction encoded into the transaction command payload is intended for an end device, a server or slave node can extract the instruction from the transaction and communicate it directly to the end device.

Broadcasting transactions as acknowledgement of action—Broadcasting a transaction to the blockchain network indicates that the action encoded in the command has been performed by the device with Device ID.

Mined transactions encoding device status and history—the blockchain acts as a (logically) centralized and physically distributed database storing complete device status and history.

Embodiments provide one or more of the following advantageous features.

Security of the underlying blockchain infrastructure—All transactions encoding transfers of value and logging IoT interactions are secured using public key cryptography and proof-of-work. Elliptic curve cryptography (ECC) based on secp256k1 parameters secure public/private keys used to identify IoT nodes, and proof of work secures the blockchain which records the IoT network status and history.

Secure key management and obfuscation—Key obfuscation techniques are used to ensure that sensitive public keys are not made vulnerable through the overuse of their corresponding private keys. Key obfuscation also enables IoT solution components to increase privacy by masking their public addresses Encryption—Device specific data contained is end-to-end encrypted (e.g. BIE1 or AES) so that only IoT nodes with decryption keys can obtain access.

Example Use Case

Figure 14:
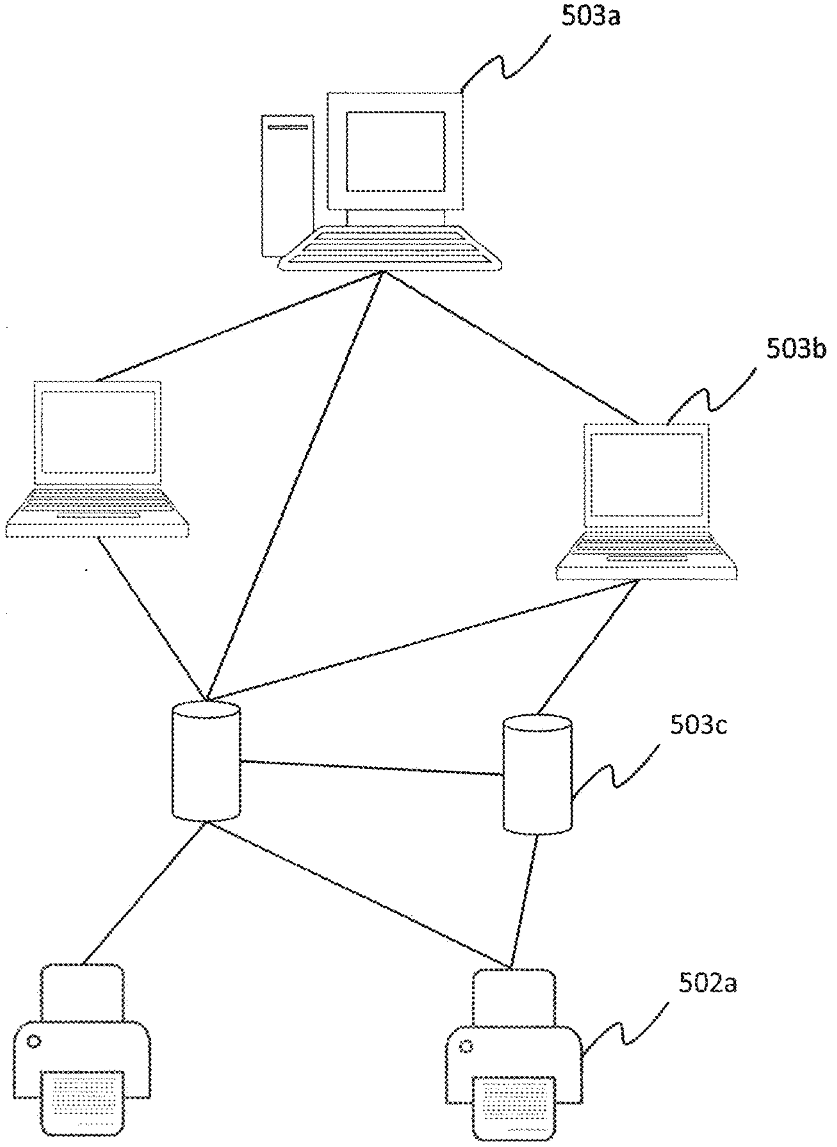
FIG. 14 schematically illustrates an example peer-to-peer printing system.

An example use case is a printer service for public libraries. In most publicly funded or university libraries cost of printing is paid for by charging a minimal amount (e.g. 6-10p) per sheet. Within the current (centralised) model, users open accounts which are managed by the library administration. Accounts need to be credited up-front and transactions must be managed by library operated software, incurring a large administration burden for libraries. The present disclosure solves this problem with its combined use of permissioning and peer-to-peer control protocols. FIG. 14 illustrates an example IoT network 501 for P2P printing.

1) A library administrator establishes a master node 503*a* (controlled by the library administrator) and configures slave nodes 503*c* which directly control the printers (end devices) 502.

2) The administrator configures a rule engine which the slave nodes 503*c* and end devices 502 will use to interpret messages. A rule engine is a system that executes one or more rules.

3) The library administrator configures the slave node 503*c*. This is a payment receiver that can directly instruct the printer to perform physical actions.

4) New Library users are permissioned by the master node 503*a* using standard registration/log-in methods (e.g. one or more credentials, e.g. username and password) are verified. The IoT permissioning algorithm is performed backend. FIG. 15*a* illustrates an example transaction used by the library administrator to issue a certificate to a new library user. In this case the library admin is the master node 503*a* and the registration authority with certificate revocation power.

5) When a user wants to print an item, the document printed can be sent within the libraries intranet system. Along with the document will be a command transaction. This transaction will contain payment to the slave node coordinating the printer, a printer device ID, and a SIGHASH_SINGLE transaction signature. FIG. 15*b* illustrates an example command transaction sent by the laptop (server) to the (slave) controller.

6) The controller (slave node) will authenticate that the transaction is a valid blockchain transaction, the transaction source (public key) has been permissioned onto the system, and the transaction value is enough to pay the cost for the instruction contained in the command.

7) If all checks are passed the slave node instructs the printer to carry out the action requested by the user.

8) The slave node will add an output that locks the payment to their address and add a signature with SIGHASH_ALL, then it will broadcast the transaction to the blockchain network 106. FIG. 15*c* illustrates an example command-acknowledgement transaction broadcast by the controller to the blockchain network 106.

CONCLUSION

It will be appreciated that the above embodiments have been described by way of example only. More generally there may be provided a method, apparatus or program in accordance with any one or more of the following Statements.

Statement 1. A computer-implemented method for granting permission to a requestor to join a first network, wherein the first network comprises a set of bridging nodes and a set of devices controllable by one or more of the set of bridging nodes, and wherein each bridging node is also a respective node of a blockchain network; the method being performing by a registration authority and comprising:

- generating a first blockchain transaction, wherein the first blockchain transaction comprises an input comprising a signature linked to a first public key of the registration authority, and a first output comprising a first certificate, wherein the first certificate comprises an identifier assigned to the requestor; and
- transmitting the first blockchain transaction to the blockchain network for inclusion in the blockchain.

Statement 2. The method of statement 1, wherein the first transaction comprises a second output locked to a second public key of the registration authority, Statement 3. The method of statement 2, wherein the first output is time-locked to the second public key of the registration authority, wherein a time-lock prevents the first output from being unlocked until after a predetermined period of time.

Statement 4. The method of statement 2 or statement 3, wherein the first output is locked to at least the second public key of the registration authority and a different public key.

The different public key could be a public key of a node of the network, or a third party that is not part of the network. This means that certificate revocation requires multiple signatures.

Statement 5. The method of any of statements 1 to 4, comprising, transmitting a transaction identifier of the first blockchain transaction to the permission requestor.

Statement 6. The method of any of statements 1 to 5, wherein the certificate is encrypted with an encryption key, the encryption key being generated by the registration authority.

For instance, the encryption key may be a random number generated by the registration authority.

Statement 7. The method of any of statements 1 to 6, comprising:

- receiving a request from the requestor to join the network, wherein the request comprises one or more credentials; and
- validating the request based on the one or more credentials, wherein said generating of the first blockchain transaction is conditional on the request being valid.

The one or more credentials may include, for example, manufacturing information and/or an IP address of the requestor.

Statement 8. The method of any of statements 1 to 7, wherein the set of bridging nodes comprises a master node and a set of intermediary nodes controllable by the master node, and wherein the registration authority is the master node.

Statement 9. The method of any of statements 1 to 8, wherein the set of bridging nodes comprises the master node and the set of intermediary nodes controllable by the master node, and wherein the requestor is the master node.

Statement 10. The method of any of statements 1 to 9, wherein the requestor is a respective node of the blockchain network, and wherein the certificate comprises a public key assigned to the permission requestor.

Statement 11. The method of any of statements 1 to 8, wherein the requestor is a device controllable by one or more bridging nodes of the first network, and wherein the method comprises:

transmitting, to the requestor, a set of certificates, each certificate in the set having been transmitted to a respective one of the set of nodes.

Statement 12. The method of any of statements 1 to 11, comprising, transmitting the first certificate to one or more of the set of bridging nodes.

Statement 13. The method of statement 2 or any statement dependent thereon, comprising:

generating a second blockchain transaction, wherein the second blockchain transaction comprises an input that references the second output of the first transaction and comprises a signature linked to the second public key of the registration authority; and transmitting the second blockchain transaction to the blockchain network for inclusion in the blockchain.

Statement 14. A computer-implemented method for requesting permission to join a first network, wherein the first network comprises a set of bridging nodes and a set of devices controllable by one or more of the set of bridging nodes, and wherein each bridging node is also a respective node of a blockchain network; the method being performing by a requestor and comprising:

transmitting, to a registration authority, a request to join the first network; and obtaining a first certificate, the certificate being issued by the registration authority and comprising an identifier assigned to the requestor.

Statement 15. The method of statement 14, wherein said obtaining comprises:

receiving a transaction identifier of a first blockchain transaction comprising the first certificate; and obtaining the first blockchain transaction from the blockchain using the transaction identifier.

Statement 16. The method of statement 15, wherein the first blockchain transaction comprises a first input comprising the certificate, and a second output linked to a public key of the registration authority and wherein the method comprises:

identifying the public key of the registration authority; and identifying one or more second certificates contained in one or more respective transactions transmitted to the blockchain from the public key of the registration authority, each second certificate being issued to a respective bridging node or device or the network.

Statement 17. The method of statement 16, wherein the first certificate comprises a public key of the requestor, wherein each second certificate issued to a respective one of the set of bridging nodes of the first network comprises a respective public key of said node, and wherein the method comprises:

transmitting a third blockchain transaction to at least one of said set of bridging nodes, wherein the third blockchain transaction comprises an output locked to the respective public key of the at least one bridging node.

Statement 18. The method of any of statements 14 to 17, said obtaining comprises of the first certificate comprises receiving the first certificate from the registration authority.

Statement 19. The method of any of statements 14 to 18, comprising:

receiving one or more second certificates from the registration authority, each second certificate being issued to a respective one of the set of bridging nodes or devices of the first network.

Statement 20. The method of statement 19, wherein the first certificate comprises a network address of the requestor, wherein each second certificate issued to the respective bridging node of the first network comprises a respective network address of said node, and wherein the method comprises:

transmitting a message to one or more of said set of bridging nodes, the message being transmitted from the network address of the requestor to the respective network address of the one or more bridging nodes to which the message is transmitted.

The network address may be an IP address.

Statement 21. The method of statement 14 or any of statements 18 to 20, wherein the requestor is one of the set of devices of the first network.

Statement 22. The method of any of statements 14 to 21, wherein the requestor is one of the set of nodes of the first network.

Statement 23. The method of statement 22, wherein the set of bridging nodes comprises a master node and one or more intermediary nodes controllable by the master node, and wherein the requestor is the master node.

Statement 24. The method of any of statements 14 to 23, wherein the request comprises one or more credentials of the requestor.

Statement 25. The method of statement 24, wherein the one or more credentials comprises an IP address of the requestor.

Statement 26. Computer equipment comprising:

memory comprising one or more memory units; and processing apparatus comprising one or more processing units, wherein the memory stores code arranged to run on the processing apparatus, the code being configured so as when on the processing apparatus to perform the method of any of statements 1 to 13.

Statement 27. A computer program embodied on computer-readable storage and configured so as, when run on computer equipment of statement 26, to perform the method of any of statements 1 to 13.

Statement 28. Computer equipment comprising:

memory comprising one or more memory units; and processing apparatus comprising one or more processing units, wherein the memory stores code arranged to run on the processing apparatus, the code being configured so as when on the processing apparatus to perform the method of any of statements 14 to 25.

Statement 29. A computer program embodied on computer-readable storage and configured so as, when run on computer equipment of statement 28, to perform the method of any of statements 14 to 25.

According to another aspect of the teachings disclosed herein, there may be provided a method comprising the actions of the registration authority and the permission requestor.

According to another aspect of the teachings disclosed herein, there may be provided a system comprising the computer equipment of the registration authority and the permission requestor.

According to another aspect of the teachings disclosed herein, there may be provided a set of transactions comprising the first and/or second blockchain transactions.

Other variants or use cases of the disclosed techniques may become apparent to the person skilled in the art once given the disclosure herein. The scope of the disclosure is not limited by the described embodiments but only by the accompanying statements.

The invention claimed is:

1. A computer-implemented method for granting permission to a requestor to join a first network, wherein the first network comprises a set of bridging nodes and a set of devices controllable by one or more of the set of bridging nodes, and wherein each bridging node is also a respective node of a blockchain network; the method being performing by a registration authority and comprising:

generating a first blockchain transaction, wherein the first blockchain transaction comprises an input comprising a signature linked to a first public key of the registration authority, a first output comprising a first certificate, and a second output locked to a second public key of the registration authority;

wherein the first certificate comprises an identifier assigned to the requestor;

transmitting the first blockchain transaction to the blockchain network for inclusion in the blockchain;

generating a second blockchain transaction, wherein the second blockchain transaction comprises an input that references the second output of the first transaction and comprises a signature linked to the second public key of the registration authority; and transmitting the second blockchain transaction to the blockchain network for inclusion in the blockchain.

2. The method of claim 1, wherein the first output is time-locked to the second public key of the registration authority, wherein a time-lock prevents the first output from being unlocked until after a predetermined period of time.

3. The method of claim 1, wherein the first output is locked to at least the second public key of the registration authority and a different public key.

4. The method of claim 1, comprising, transmitting a transaction identifier of the first blockchain transaction to the permission requestor.

5. The method of claim 1, wherein the certificate is encrypted with an encryption key, the encryption key being generated by the registration authority.

6. The method of claim 1, comprising:

receiving a request from the requestor to join the network, wherein the request comprises one or more credentials; and validating the request based on the one or more credentials, wherein said generating of the first blockchain transaction is conditional on the request being valid.

7. The method of claim 1, wherein the set of bridging nodes comprises a master node and a set of intermediary nodes controllable by the master node, and wherein the registration authority is the master node.

8. The method of claim 7, wherein the set of bridging nodes comprises the master node and the set of intermediary nodes controllable by the master node, and wherein the requestor is the master node.

9. The method of claim 1, wherein the requestor is a respective node of the blockchain network, and wherein the certificate comprises a public key assigned to the permission requestor.

10. The method of claim 1, wherein the requestor is a device controllable by one or more bridging nodes of the first network, and wherein the method comprises:

transmitting, to the requestor, a set of certificates, each certificate in the set having been transmitted to a respective one of the set of bridging nodes.

11. The method of claim 1, comprising, transmitting the first certificate to one or more of the set of bridging nodes.

12. Computer equipment, comprising:

memory comprising one or more memory units; and processing apparatus comprising one or more processing units, wherein the memory stores code arranged to run on the processing apparatus, the code being configured so as when executed on the processing apparatus, the processing apparatus performs a method for granting permission to a requestor to join a first network, wherein the first network comprises a set of bridging nodes and a set of devices controllable by one or more of the set of bridging nodes, and wherein each bridging node is also a respective node of a blockchain network; the method comprising:

generating a first blockchain transaction, wherein the first blockchain transaction comprises an input comprising a signature linked to a first public key of a registration authority, a first output comprising a first certificate, and a second output locked to a second public key of the registration authority, wherein the first certificate comprises an identifier assigned to the requestor;

transmitting the first blockchain transaction to the blockchain network for inclusion in the blockchain;

generating a second blockchain transaction, wherein the second blockchain transaction comprises an input that references the second output of the first transaction and comprises a signature linked to the second public key of the registration authority; and transmitting the second blockchain transaction to the blockchain network for inclusion in the blockchain.

13. The computer equipment of claim 12, wherein the first output is time-locked to the second public key of the registration authority, wherein a time-lock prevents the first output from being unlocked until after a predetermined period of time.

14. The computer equipment of claim 12, wherein the first output is locked to at least the second public key of the registration authority and a different public key.

15. The computer equipment of claim 12, wherein the code, when executed on the processing apparatus, causes the processing apparatus to transmit a transaction identifier of the first blockchain transaction to the permission requestor.

16. The computer equipment of claim 12, wherein the certificate is encrypted with an encryption key, the encryption key being generated by the registration authority.

17. The computer equipment of claim 12, wherein the code, when executed on the processing apparatus, causes the processing apparatus to:

receive a request from the requestor to join the network, wherein the request comprises one or more credentials; and validate the request based on the one or more credentials, wherein said generating of the first blockchain transaction is conditional on the request being valid.

18. The computer equipment of claim 12, wherein the set of bridging nodes comprises a master node and a set of intermediary nodes controllable by the master node, and wherein the registration authority is the master node.

19. The computer equipment of claim 18, wherein the set of bridging nodes comprises the master node and the set of intermediary nodes controllable by the master node, and wherein the requestor is the master node.

20. A computer program product embodied on a non-transitory computer-readable storage medium and configured so as, when run on computer equipment, the computer equipment performs a method for granting permission to a requestor to join a first network, wherein the first network comprises a set of bridging nodes and a set of devices controllable by one or more of the set of bridging nodes, and wherein each bridging node is also a respective node of a blockchain network; the method comprising:

generating a first blockchain transaction, wherein the first blockchain transaction comprises an input comprising a signature linked to a first public key of a registration authority, a first output comprising a first certificate, and a second output locked to a second public key of the registration authority, wherein the first certificate comprises an identifier assigned to the requestor;

transmitting the first blockchain transaction to the blockchain network for inclusion in the blockchain generating a second blockchain transaction, wherein the second blockchain transaction comprises an input that references the second output of the first transaction and comprises a signature linked to the second public key of the registration authority; and transmitting the second blockchain transaction to the blockchain network for inclusion in the blockchain.

* * * * *